(12) United States Patent
Becher et al.

(10) Patent No.: US 11,687,878 B2
(45) Date of Patent: Jun. 27, 2023

(54) PRIVACY-PRESERVING SUPPLY CHAIN VERIFICATION FOR MULTIPLE ASSET TYPES IN SHARED DATA STORAGE SCENARIOS

(71) Applicant: SAP SE, Walldorf (DE)

(72) Inventors: Kilian Becher, Dresden (DE); Axel Schroepfer, Borthen (DE); Julius Albert Gregor Lagodzinski, Berlin (DE); Christian Hellwig, Darmstadt (DE)

(73) Assignee: SAP SE, Walldorf (DE)

( * ) Notice: Subject to any disclaimer, the term of this patent is extended or adjusted under 35 U.S.C. 154(b) by 453 days.

(21) Appl. No.: 17/079,725

(22) Filed: Oct. 26, 2020

(65) Prior Publication Data
US 2022/0129847 A1     Apr. 28, 2022

(51) Int. Cl.
| | |
|---|---|
| *H04L 29/06* | (2006.01) |
| *G06Q 10/0875* | (2023.01) |
| *H04L 9/32* | (2006.01) |
| *H04L 9/00* | (2022.01) |

(52) U.S. Cl.
CPC ......... *G06Q 10/0875* (2013.01); *H04L 9/008* (2013.01); *H04L 9/3257* (2013.01); *H04L 9/3268* (2013.01)

(58) Field of Classification Search
None
See application file for complete search history.

(56) References Cited

U.S. PATENT DOCUMENTS

| | | | | |
|---|---|---|---|---|
| 8,145,897 | B2 * | 3/2012 | Brickell | H04L 9/3073 713/176 |
| 8,499,149 | B2 * | 7/2013 | Chen | H04L 9/3218 713/168 |
| 8,527,758 | B2 * | 9/2013 | Mansour | H04L 63/0861 713/168 |

(Continued)

OTHER PUBLICATIONS

Becher et al., "Privacy-Preserving Public Verification of Ethical Cobalt Sourcing" Trust, Security and Privacy in Computing and Communications (TrustCom), 2020, 9 pages.

(Continued)

*Primary Examiner* — Maung T Lwin
(74) *Attorney, Agent, or Firm* — Fish & Richardson P.C.

(57) ABSTRACT

Methods, systems, and computer-readable storage media for receiving an index and a random number from a verifier, receiving, from a shared data storage, encrypted supply chain data (SCD) of a supply chain actor (SCA), re-encrypting the encrypted SCD to provide re-encrypted SCD using a public encryption key of a decryption party, executing homomorphic operations on the re-encrypted SCD to provide an encrypted blinded result using second random numbers, receiving an encrypted modified blinded result, generating an encrypted blinded verification result using a verification function, the encrypted blinded result, the encrypted modified blinded result, and the random number, and sending the encrypted blinded verification result for decryption to provide a blinded verification result to the verifier, the verifier determining a verification result based on the blinded verification result and the random number, and comparing the verification result to a product claim.

20 Claims, 11 Drawing Sheets

(56) References Cited

U.S. PATENT DOCUMENTS

| | | | |
|---|---|---|---|
| 8,745,370 B2 | 6/2014 | Chaves et al. | |
| 2013/0204794 A1* | 8/2013 | Sahota | G06Q 20/388 |
| | | | 705/67 |
| 2014/0047242 A1* | 2/2014 | Ukil | H04L 9/083 |
| | | | 713/171 |
| 2014/0208102 A1* | 7/2014 | Pryakhin | G06F 21/62 |
| | | | 713/165 |
| 2018/0137512 A1* | 5/2018 | Georgiadis | H04L 63/08 |
| 2019/0273607 A1* | 9/2019 | Van Der Velden | H04L 9/088 |
| 2019/0386814 A1* | 12/2019 | Ahmed | H04L 9/008 |
| 2020/0259828 A1* | 8/2020 | Shaffer | H04L 63/0853 |

OTHER PUBLICATIONS

Bitcoin.org [online], "Bitcoin: A Peer to Peer Electronic Cash System" 2008, [Retrieved on Jan. 21, 2021], retrieved from: URL <https://Bitcoin.org/bitcoin.pdf>, 24 pages.

Blaze et al., Divertible protocols and atomic proxy cryptography, In Advances in Cryptology—EUROCRYPT'98, 1998, 18 pages.

Fan et al., "Somewhat Practical Fully Homomorphic Encryption." IACR Cryptol. ePrint Arch. 2012, 19 pages.

Gentry, "A fully homomorphic encryption scheme" PhD thesis, Stanford University, vol. 20. No. 9, 2009, 209 pages.

Ivan et al., "Proxy cryptography revisited" In Proceedings of the Network and Distributed System Security Symposium, 2003, 20 pages.

Kannengieber et al., "What does not fit can be made to fit! trade-offs in distributed ledger technology designs" In Proceedings of the 52nd Hawaii International Conference on System Sciences, 2019, 10 pages.

Katz et al., "Introduction to Modern Cryptography" Chapman & Hall/CRC, 2nd Edition, 2014, 511 pages.

Lewenberg et al., "Inclusive Block Chain Protocols" In Financial Cryptography and Data Security, 2015, 34 pages.

Paillier, "Public-key cryptosystems based on composite degree residuosity classes" In Advances in Cryptology—EUROCRYPT'99, 1999, 16 pages.

Polyakov et al., "Fast proxy re-encryption for publish/subscribe systems" ACM Transactions on Privacy and Security, 2017, 31 pages.

Rivest et al., "A Method for obtaining digital signatures and public-key cryptosystems" Communications of the ACM, 1978, 15 pages.

* cited by examiner

400

1: $C \rightarrow RP$    $\theta$
2: $C \rightarrow RP$    $r_0$
3: $DL \rightarrow RP$    $(\ldots, E_{A_i}(x_j), \ldots)$
4: $DL \rightarrow RP$    $(\ldots, E_{A_i}(p_{j_k}), \ldots)$
5: $DL \rightarrow RP$    $(\ldots, E_{RP}(t_j), \ldots)$
6: $RP$    $\forall j: E_{DP}(x_j) = RE(E_{A_i}(x_j), pk_{A_i \rightarrow DP})$
7: $RP$    $\forall j: E_{DP}(p_{j_k}) = RE(E_{A_i}(p_{j_k}), pk_{A_i \rightarrow DP})$
8: $RP$    $\forall j: t_j = D_{RP}(E_{RP}(t_j))$
9: $RP$    $\forall j: E_{DP}(p_j) = E_{DP}\left(\prod_k p_{j_k}\right) = \bigodot_k E_{DP}(p_{j_k})$
10: $RP$    $\forall t: E_{DP}(S_t) = E_{DP}\left(\sum_j (p_j \cdot x_j)\right) = \bigoplus_j \left(E_{DP}(p_j) \odot E_{DP}(x_j)\right)$
11: $RP$    $\forall t: 0 < r_{2,t} \ll r_{1,t}$
12: $RP$    $\forall t: E_{DP}(S'_t) = E_{DP}(S_t \cdot r_{1,t} + r_{2,t}) = \left(E_{DP}(S_t) \odot E_{DP}(r_{1,t})\right) \oplus E_{DP}(r_{2,t})$
13: $RP \rightarrow DP$    $\forall t: E_{DP}(S'_t)$
14: $DP$    $\forall t: S'_t = D_{DP}(E_{DP}(S'_t))$
15: $DP$    $\forall t: S'^{-1}_t = \dfrac{1}{S'_t}$
16: $DP \rightarrow RP$    $\forall t: E_{DP}(S'^{-1}_t)$
17: $RP$    $\forall t: E_{DP}(S^{-1}_t) = E_{DP}(S'^{-1}_t \cdot r_{1,t}) = E_{DP}(S'^{-1}_t) \odot E_{DP}(r_{1,t})$
18: $RP$    $E_{DP}(\theta) = f(\ldots, E_{DP}(S_t), E_{DP}(S^{-1}_t), \ldots)$
19: $RP$    $E_{DP}(\theta') = E_{DP}(\theta + r_0) = E_{DP}(\theta) \oplus E_{DP}(r_0)$
20: $RP \rightarrow DP$    $E_{DP}(\theta')$
21: $DP$    $\theta' = D_{DP}(E_{DP}(\theta'))$
22: $DP \rightarrow C$    $\theta'$
23: $C$    $\theta = \theta' - r_0$

| | | |
|---|---|---|
| 1: | $C \to RP$ | $\theta$ |
| 2: | $C \to RP$ | $r_0$ |
| 3: | $DL \to RP$ | $(\ldots, E_{A_i}(x_j), \ldots)$ |
| 4: | $DL \to RP$ | $(\ldots, p_{jk}, \ldots)$ |
| 5: | $DL \to RP$ | $(\ldots, E_{RP}(t_i), \ldots)$ |
| 6: | $RP$ | $\forall j: E_{DP}(x_j) = RE(E_{A_i}(x_j), pk_{A_i \to BP})$ |
| 7: | $RP$ | $\forall j: t_j = D_{RP}(E_{RP}(t_j))$ |
| 8: | $RP$ | $\forall j: t_j = \prod_k p_{jk}$ |
| 9: | $RP$ | $\forall t: E_{DP}(S_t) = E_{DP}\left(\sum_j (p_j \cdot x_j)\right) = \bigoplus_j \left(p_j \odot E_{DP}(x_j)\right)$ |
| 10: | $RP$ | $\forall t: 0 < r_{2,t} \ll r_{1,t}$ |
| 11: | $RP$ | $\forall t: E_{DP}(S'_t) = E_{DP}(S_t \cdot r_{1,t} + r_{2,t}) = \left(E_{DP}(S_t) \odot E_{DP}(r_{1,t})\right) \oplus E_{DP}(r_{2,t})$ |
| 12: | $RP \to DP$ | $\forall t: E_{DP}(S'_t)$ |
| 13: | $DP$ | $\forall t: S'_t = D_{DP}(E_{DP}(S'_t))$ |
| 14: | $DP$ | $\forall t: S'^{t-1}_t = \frac{1}{S'_t}$ |
| 15: | $DP \to RP$ | $\forall t: E_{DP}(S'^{t-1}_t)$ |
| 16: | $RP$ | $\forall t: E_{DP}(S^{t-1}_t) = E_{DP}(S'^{t-1}_t \cdot r_{1,t}) = E_{DP}(S'^{t-1}_t) \odot E_{DP}(r_{1,t})$ |
| 17: | $RP$ | $E_{DP}(\rho) = f(\ldots, E_{DP}(S^{t-1}_t), E_{DP}(S^{t-2}_t), \ldots)$ |
| 18: | $RP$ | $E_{DP}(\rho') = E_{DP}(\rho + r_0) = E_{DP}(\rho) \oplus E_{DP}(r_0)$ |
| 19: | $RP \to DP$ | $E_{DP}(\rho')$ |
| 20: | $DP$ | $\rho' = D_{DP}(E_{DP}(\rho'))$ |
| 21: | $DP \to C$ | $\rho'$ |
| 22: | $C$ | $\rho = \rho' - r_0$ |

*FIG. 8*

1: $C \to RP$    $\theta$

2: $C \to RP$    $r_1, r_2$

3: $DL \to RP$    $(..., E_A(x_j), ...)$

4: $DL \to RP$    $\forall j : (p_{j_1}, ..., p_{j_k}, ..., p_{j_d})$

5: $RP$    $(..., E_{DP}(x_j) = RE(E_A(x_j), rk_{A \to DP}), ...)$

6: $RP$    $\forall j : y_j = g_j \cdot f_A = \prod_{k=1}^{d} p_{j_k}$

7: $RP$    $E_{DP}(S_{ASM}) = E_{DP}\left(\sum_{j=1}^{m}(x_{j_{ASM}} \cdot p_{j_{ASM}})\right) = \bigoplus_{j=1}^{m}(E_{DP}(x_{j_{ASM}}) \odot E_{DP}(p_{j_{ASM}}))$ 8: $RP$    $E_{DP}(S_{Total}) = E_{DP}\left(\sum_{j=1}^{m}(x_j \cdot p_j)\right) = \bigoplus_{j=1}^{m}(E_{DP}(x_j) \odot E_{DP}(p_j))$ 9: $RP$    $E_{DP}(S'_{ASM}) = E_{DP}(S_{ASM} \cdot r_3) = E_{DP}(S_{ASM}) \odot E_{DP}(r_3)$ 10: $RP$    $E_{DP}(S'_{Total}) = E_{DP}(S_{Total} \cdot r_3) = E_{DP}(S_{Total}) \odot E_{DP}(r_3)$ 11: $RP \to DP$    $E_{DP}(S''_{ASM}) = E_{DP}(S'_{ASM} + r_1) = E_{DP}(S_{ASM} \cdot r_3 + r_1) = E_{DP}(S_{ASM}) \odot E_{DP}(r_3) \oplus E_{DP}(r_1)$ 12: $RP \to DP$    $E_{DP}(S''_{Total}) = E_{DP}(S'_{Total} + r_2) = E_{DP}(S_{Total} \cdot r_3 + r_2) = E_{DP}(S_{Total}) \odot E_{DP}(r_3) \oplus E_{DP}(r_2)$ 13: $DP \to C$    $S''_{ASM} = D_{DP}(E_{DP}(S''_{ASM}))$ 14: $DP \to C$    $S''_{Total} = D_{DP}(E_{DP}(S''_{Total}))$ 15: $C$    $\rho = \dfrac{S'_{ASM}}{S'_{Total}} = \dfrac{S''_{ASM} - r_1}{S''_{Total} - r_2}$

PRIVACY-PRESERVING SUPPLY CHAIN VERIFICATION FOR MULTIPLE ASSET TYPES IN SHARED DATA STORAGE SCENARIOS

BACKGROUND

An enterprise uses a supply chain to transform and move products or services between one or more suppliers (entities, partners or companies) to a customer in a manufacturing process. The supply chain is a system that can involve various organizations and people inside and outside of the enterprise. Additionally, the supply chain can utilize technologies, activities, and information to transform natural resources, raw materials and components from the one or more suppliers into a finished product that can be delivered to customers.

Enterprises often make claims about their products in an effort to attract customers and/or convey impressions about the products. Example claims can include, but are not limited to, mineral quantities (e.g., this product contains 58.3% gold), sustainable manufacture (e.g., this product is made from 100% sustainably sourced palm oil), and ethical manufacture (e.g., no child or forced labor was used in manufacture of this product). While consumers can be attracted to such claims, it can be difficult for a consumer to verify such claims without specific information about the supply chain that the product evolved through.

Decentralized systems have been developed to enhance information security and authenticity. An example decentralized system includes a so-called distributed ledger system (DLS), which can also be referred to as a consensus network, and/or a blockchain network. DLSs enable participating entities to securely, and immutably store data within a distributed ledger, also referred to as a blockchain. The distributed ledger is decentralized in that multiple nodes in the DLS have to reach consensus as to the information stored in the distributed ledger, and in that a copy of the ledger is stored in multiple nodes across the DLS. Once stored in the distributed ledger, the data is considered to be immutable.

With the increasing popularity of DLSs, DLS-based supply chain traceability systems have been developed. Such DLS-based supply chain traceability systems ensure supply chain transparency and provide a channel for verifying product claims. DLS-based supply chain traceability systems persistently carry information about each individual transaction throughout a supply chain, and enable tracking of a product lifecycle from, for example, the sourcing (e.g., mining) of ingredients to assembly and eventual disposal. Any party that has access to the distributed ledger can verify transactions that had occurred along the supply chain transactions. For example, a customer could verify whether a metal alloy in a product in fact has the ratio that is claimed by the vendor of the product. To do so, the customer, or any verifier, could traverse the distributed ledger backwards and read any entry from the final product to its components to its base ingredients. In this manner, transparency is provided and technology-based customer trust in products can be established.

While distributed ledgers inherently ensure traceability, transparency, and integrity, the confidentiality of transaction details is not ensured by default. Consequently, supply chain actors have privacy concerns. For example, transaction details could leak bills of materials (BOMs), trade secrets (e.g., recipes, customers) as well as storage capacities and warehouse stocks. Leaking this kind of information would cost supply chain actors their competitive advantages. Consequently, supply chain actors are reluctant to participate in transparent supply chains making simple verification by consumers impossible. Existing solutions fail to ensure public verifiability and at the same time protect confidentiality of transaction details.

SUMMARY

Implementations of the present disclosure are directed to supply chain traceability systems. More particularly, implementations of the present disclosure are directed to a supply chain traceability (SCT) platform and a verification protocol executed within the SCT platform that ensures confidentiality of transaction details by encrypting supply chain data (SCD) before storing the encrypted SCD in a shared data storage. The SCT platform of the present disclosure enables, among other things, claims regarding products to be verified without leaking SCD.

In some implementations, actions include receiving, by a system of a re-encryption party, an index and a first set of random numbers from a computing device of a verifier, the first set of random numbers including one or more random numbers, receiving, by the system of the re-encryption party and from a shared data storage, encrypted supply chain data (SCD) of a supply chain actor (SCA), re-encrypting, by the system of the re-encryption party, the encrypted SCD to provide re-encrypted SCD, the encrypted SCD being re-encrypted under a public encryption key of a decryption party, executing, by the system of the re-encryption party, one or more homomorphic operations on the re-encrypted SCD to provide an encrypted blinded result using a second set of random numbers, receiving, by the system of the re-encryption party and from a system of the decryption party, an encrypted modified blinded result, generating, by the system of the re-encryption party, an encrypted blinded verification result using a verification function, the encrypted blinded result, the encrypted modified blinded result, and the first set of random numbers, and sending, from the system of the re-encryption party to the system of the decryption party, the encrypted blinded verification result, the system of the decryption party decrypting the encrypted blinded verification result to provide a blinded verification result to the computing device of the verifier, the computing device determining a verification result based on the blinded verification result and the first set of random numbers, and comparing the verification result to the product claim. Other implementations of this aspect include corresponding systems, apparatus, and computer programs, configured to perform the actions of the methods, encoded on computer storage devices.

These and other implementations can each optionally include one or more of the following features: the encrypted SCD is determined from the shared data storage by traversing entries to an entry of the SCA, the entry storing the encrypted SCD; the encrypted blinded verification result is at least partially generated by: providing an encrypted verification result from the verification function, and executing at least one homomorphic operation on the encrypted verification result using the first set of random numbers to provide the encrypted blinded verification result; the system of the decryption party generates the encrypted modified blinded result by: receiving the encrypted blinded result from the system of the re-encryption party, decrypting, using a secret decryption key of the decryption party, the encrypted blinded result to provide a blinded result, executing a mathematical operation on the blinded result to provide a modified blinded result, and encrypting the modified blinded result using the public encryption key of the decryption party to provide the encrypted modified blinded result; the second set of random numbers includes a first random number and a second random number, the first random number being exponentially larger than the second random number and the second random number being greater than zero; the encrypted SCD is encrypted with a public encryption key of the SCA; and the shared data storage includes a distributed ledger.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 4 depicts a verification protocol in accordance with implementations of the present disclosure.

FIG. 6 depicts a verification protocol for a limited number of asset types in accordance with implementations of the present disclosure.

FIG. 8 depicts a verification protocol for plaintext ratios in accordance with implementations of the present disclosure.

FIG. 10 depicts a verification protocol for an example context in accordance with implementations of the present disclosure.

Like reference symbols in the various drawings indicate like elements.

DETAILED DESCRIPTION

Figure 1:
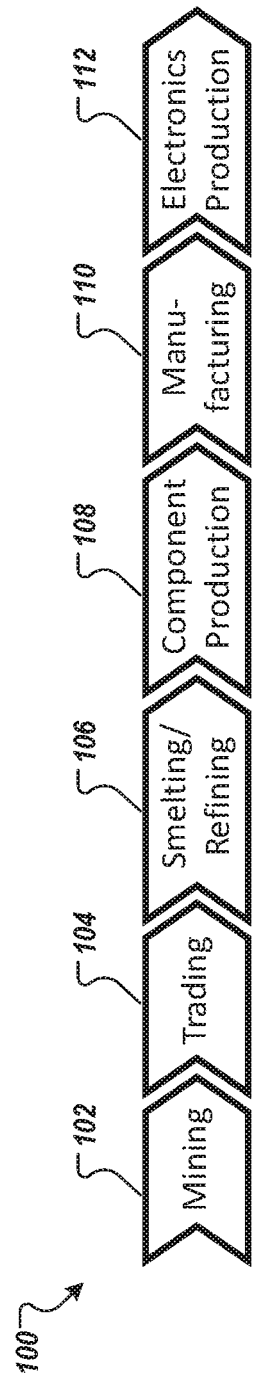
FIG. 1 depicts a conceptual representation of an example supply chain.

Implementations of the present disclosure are directed to supply chain traceability systems. More particularly, implementations of the present disclosure are directed to a supply chain traceability (SCT) platform and a verification protocol executed within the SCT platform that ensures confidentiality of transaction details by encrypting supply chain data (SCD) before storing the encrypted SCD in a shared data storage. The SCT platform of the present disclosure enables, among other things, claims regarding products to be verified without leaking SCD.

Implementations can include actions of receiving, by a system of a re-encryption party, an index and a first set of random numbers from a computing device of a verifier, the first set of random numbers including one or more random numbers, receiving, by the system of the re-encryption party and from a shared data storage, encrypted supply chain data (SCD) of a supply chain actor (SCA), re-encrypting, by the system of the re-encryption party, the encrypted SCD to provide re-encrypted SCD, the encrypted SCD being re-encrypted under a public encryption key of a decryption party, executing, by the system of the re-encryption party, one or more homomorphic operations on the re-encrypted SCD to provide an encrypted blinded result using a second set of random numbers, receiving, by the system of the re-encryption party and from a system of the decryption party, an encrypted modified blinded result, generating, by the system of the re-encryption party, an encrypted blinded verification result using a verification function, the encrypted blinded result, the encrypted modified blinded result, and the first set of random numbers, and sending, from the system of the re-encryption party to the system of the decryption party, the encrypted blinded verification result, the system of the decryption party decrypting the encrypted blinded verification result to provide a blinded verification result to the computing device of the verifier, the computing device determining a verification result based on the blinded verification result and the first set of random numbers, and comparing the verification result to the product claim.

To provide further context for implementations of the present disclosure, and as introduced above, an enterprise uses a supply chain to transform and move products or services between one or more suppliers (entities, partners or companies) to a customer in a manufacturing process. The supply chain is a system that can involve various organizations and people inside and outside of the enterprise. Additionally, the supply chain can utilize technologies, activities, and information to transform natural resources, raw materials and components from the one or more suppliers into a finished product that can be delivered to customers.

Enterprises often make claims about their products in an effort to attract customers and/or convey impressions about the products. Example claims can include, but are not limited to, mineral quantities (e.g., this product contains 58.3% gold), sustainable manufacture (e.g., this product is made from 100% sustainably sourced palm oil), and ethical manufacture (e.g., no child or forced labor was used in manufacture of this product). While consumers can be attracted to such claims, it can be difficult for a consumer to verify such claims without specific information about the supply chain that the product evolved through.

Decentralized systems have been developed to enhance information security and authenticity. An example decentralized system includes a so-called distributed ledger system (DLS), which can also be referred to as a consensus network, and/or a blockchain network. DLSs enable participating entities to securely, and immutably store data within a distributed ledger, also referred to as a blockchain. The distributed ledger is decentralized in that multiple nodes in the DLS have to reach consensus as to the information stored in the distributed ledger, and in that a copy of the ledger is stored in multiple nodes across the DLS. Once stored in the distributed ledger, the data is considered to be immutable.

With the increasing popularity of DLSs, DLS-based supply chain traceability systems have been developed. Such DLS-based supply chain traceability systems ensure supply chain transparency and provide a channel for verifying product claims. DLS-based supply chain traceability systems persistently carry information about each individual transaction throughout a supply chain, and enable tracking of a product lifecycle from, for example, the sourcing (e.g., mining) of ingredients to assembly and eventual disposal. Any party that has access to the distributed ledger can verify transactions that had occurred along the supply chain transactions. For example, a customer could verify whether a metal alloy in a product in fact has the ratio that is claimed by the vendor of the product. To do so, the customer, or any verifier, could traverse the distributed ledger backwards and read any entry from the final product to its components to its base ingredients. In this manner, transparency is provided and technology-based customer trust in products can be established.

While distributed ledgers inherently ensure traceability, transparency, and integrity, the confidentiality of transaction details is not ensured by default. Consequently, supply chain actors have privacy concerns. For example, transaction details could leak bills of materials (BOMs), trade secrets (e.g., recipes, customers) as well as storage capacities and warehouse stocks. Leaking this kind of information would cost supply chain actors their competitive advantages. Consequently, supply chain actors are reluctant to participate in transparent supply chains making simple verification by consumers impossible. Among other problems, existing solutions fail to ensure public verifiability and at the same time protect confidentiality of transaction details.

In view of the above context, implementations of the present disclosure provide a SCT platform and a verification protocol executed within the SCT platform that ensures confidentiality of transaction details by encrypting SCD before storing the encrypted SCD in a shared data storage. As described in further detail herein, the verification protocol is technology-agnostic with respect to the form of the shared data storage. However, implementations of the present disclosure are described in further detail herein in the example context of distributed ledgers. As also described in further detail herein, the verification protocol of the present disclosure can be described as a cryptographic protocol that uses cryptographic techniques including fully homomorphic encryption (FHE) and proxy re-encryption. In some examples, the verification protocol computes arbitrary arithmetic verification functions based on the encrypted SCD. The verification functions can be executed to verify claims about products without leaking SCD.

In applying FHE and proxy re-encryption, the SCT platform of the present disclosure overcomes technical hurdles. For example, at a high level, FHE is applied as a layer on top of a data storage (e.g., distributed ledger). At a lower level, a need for a more sophisticated construction arises, because parties are assumed to be mutually distrustful. In view of this, implementations of the present disclosure enable supply chain actors (SCAs or SC actors) to encrypt their transaction details with respective encryption keys (i.e., each SCA uses their own encryption key). This prevents SCAs from reading and decrypting each other's confidential data stored on, for example, a distributed ledger. In subsequent steps of the cryptographic protocol, all data is re-encrypted under a common encryption key.

In verifying data, computation of the verification function is conducted using encrypted data. Consequently, neither confidential SCD nor the verification result itself are decrypted at any time. By enabling arbitrary verification functions, implementations of the present disclosure provide improved verification capabilities over unencrypted supply chain traceability systems, namely, enabling verification with strong privacy guarantees. More particularly, and unlike existing solutions, implementations of the present disclosure publish and process production details in encrypted form by employing FHE and proxy re-encryption. Thus, implementations of the present disclosure ensure a high level of confidentiality of SCD. Further, execution of the protocol that represent product claims has constant consumer-side complexity. In this manner, verification of product claims can be performed using computing devices having limited computing capacity and/or bandwidth for communication, such as mobile computing devices (e.g., smartphones).

As described in further detail herein, the SCT platform of the present disclosure implies a concept of negligibility of a function and leverages both homomorphic encryption and proxy re-encryption. Further, in some examples, the SCT platform leverages a distributed ledger. However, implementations of the present disclosure are not limited to distributed ledgers. Each of negligibility, homomorphic encryption, proxy re-encryption, and distributed ledgers are described in further detail herein.

With regard to negligibility, a function $f$ can map natural numbers to non-negative real numbers. The function $f$ is considered negligible, if, for every positive polynomial p, there is a value $m \in \mathbb{N}$, such that the following applies for all integers n>m:

$$f(n) < \frac{1}{p(n)}$$

With regard to homomorphic encryption, an asymmetric cryptosystem ($\mathcal{CS}$) is provided as a triple ($\mathcal{CS}$ =(G, E, D)), which includes algorithms (G, E, D), each of which executes in polynomial-time. A probabilistic key-generation algorithm G(•) takes a security parameter κ as input and outputs a key pair (pk, sk) defined as a (public) encryption key pk and a (secret) decryption key sk. A (probabilistic) encryption algorithm E(•) takes a plaintext $m \in \mathcal{M}$ and pk as input and outputs a ciphertext $c=E(m, pk) \in \mathcal{C}$. Here, $\mathcal{M}$ and $\mathcal{C}$ denote the plaintext and ciphertext space, respectively. In some examples, $\mathcal{M} \subset \mathbb{Z}$ are real numbers that are scaled and rounded prior to encryption. A decryption algorithm D(•) takes a ciphertext c and sk as input and outputs the plaintext in =D(c, sk)=D(E(m, pk), sk). For simplification purposes, encryption of m with a party $P_i$'s public key $pk_i$ is denoted as $c=E_i(m)$, and decryption of c with $P_i$'s secret key $sk_i$ is denoted as $m=D_i(c)$.

A symmetric cryptosystem ($\mathcal{CS}$) is provided as a tuple ($\mathcal{CS}$ =(G, E, D)), which includes algorithms (G, E, D), each of which executes in polynomial-time. A probabilistic key-generation algorithm G(•) takes a security parameter θ as input and outputs a single (secret) key sk, which can be used for encryption and decryption. A (probabilistic) encryption algorithm E(•) takes a plaintext m∈$\mathcal{M}$ and sk as input and outputs a ciphertext c=E(m, sk)∈$\mathcal{C}$. Here, $\mathcal{M}$ and $\mathcal{C}$ denote the plaintext and ciphertext space, respectively. In some examples, $\mathcal{M} \subset \mathbb{Z}$ are real numbers that are scaled and rounded prior to encryption. A decryption algorithm D(•) takes a ciphertext c and sk as input and outputs the plaintext m=D(c, sk)=D(E(m, sk), sk). For simplification purposes, encryption of m with a party $P_i$'s secret key $sk_i$ is denoted as c=$E_i$(m), and decryption of c with $P_i$'s secret key $sk_i$ is denoted as m=$D_i$(c).

Homomorphic encryption (HE) schemes enable computations to be performed on ciphertexts that are encrypted under the same encryption key. A cryptosystem $\mathcal{CS}$ is homomorphic, if applying an operation ○ to ciphertexts $E_i(m_1)$ and $E_i(m_2)$ yields the ciphertext $E_i$(m) of the result m=$m_1$•$m_2$ of a corresponding homomorphic operation •applied to the plaintexts $m_1$ and $m_2$. This can be formalized as follows:

$$D_i(E_i(m_1) \circ E_i(m_2)) = m_1 \bullet m_2$$

Homomorphic operations typically include addition and multiplication, as represented in the following relationships:

$$D_i(E_i(m_1) \oplus E_i(m_2)) = m_1 + m_2$$

$$D_i(E_i(m_1) \odot E_i(m_2)) = m_1 \cdot m_2$$

Partially homomorphic encryption (PHE) schemes, such as Paillier's and Rivest-Shamir-Adleman (RSA), typically enable either addition or multiplication of the underlying plaintexts. In contrast, FHE schemes, such as Brakerski/Fan-Vercauteren (BFV), provide both addition and multiplication. Consequently, FHE enables privacy-preserving evaluation of arbitrary arithmetic functions.

With regard to proxy re-encryption (PRE), re-encryption can be described as a process of transforming a ciphertext $c_1$=$E_1$(m) encrypted under a public key $pk_1$ into a ciphertext $c_2$=$E_2$(m) of the same plaintext, encrypted under a different public key $pk_2$. PRE enables an entrusted party to perform this transformation. PRE can be used for bidirectional settings and unidirectional settings. While the former enables the proxy to transform ciphertexts from $pk_1$ to $pk_2$ and vice-versa, the latter enables re-encryption only in one direction. In some examples, a PRE scheme can be defined as a tuple of procedures:

Parameter generation—PG(κ): Computes a set of public parameters pp related to the security parameter κ.

Key generation—KG (pp): Computes a key pair (pk, sk) consisting of a public and a secret key.

Re-encryption-key generation—ReKG($sk_i$, $pk_j$): Given a secret key $sk_i$ and a public key $pk_{j \neq i}$, this procedure computes a re-encryption key $rk_{i \to j}$ that enables re-encryption of ciphertexts from $pk_i$ to $pk_j$.

Encryption—E(m, pk): Encrypts a plaintext m using pk and returns the ciphertext c.

Decryption—D(c, sk): Decrypts a ciphertext c using sk and returns the plaintext m.

Re-encryption—RE($c_i$,$rk_{i \to j}$): Transforms a ciphertext $c_i$ of m encrypted under $pk_i$ into a ciphertext $c_j$ of m such that $c_j$ encrypts m under $pk_{j \neq i}$.

With regard to distributed ledgers (also referred to as blockchains), distributed ledger technology (DLT) provides tools for finding consensus on digital data among mutually distrusting parties. Such distributed ledgers are append-only data storage that are maintained in a distributed manner among nodes in a decentralized network. Each node locally holds a copy of the distributed ledger. Digital data is represented on the ledger as transactions. When a party adds a transaction, the transaction is distributed among the nodes, which then validate the transaction and agree on the current state of the ledger through a distributed consensus mechanism. Once consensus has been achieved, all nodes update their local copies to the agreed state. The distributed consensus mechanism ensures that subsequent modification of appended transactions is mathematically hard, which implies a high level of integrity.

DLTs can employ cryptographic primitives, for instance in order to ensure proper transaction authentication. There are a variety of different DLT concepts, which mostly differ in the way they store transactions. The most prominent distributed ledger is blockchain introduced with the Bitcoin crypto-currency, where a block (provided as a set of transactions) is linked with a single predecessor block, forming a chain of blocks. Other concepts include arranging blocks in directed acyclic graphs with multiple predecessors per block. Depending on the requirements resulting from the respective use case, distributed ledgers may focus on different characteristics, such as availability, consistency, integrity, and throughput. One distinctive feature of distributed ledgers is the access to a decentralized network. In permissioned ledgers, permission is required to join the network. In contrast, permissionless ledgers allow anyone to join. While implementations of the present disclosure are agnostic in terms of the shared data storage that can be used, distributed ledgers that provide a high level of integrity are discussed by way of non-limiting example.

Implementations of the present disclosure are described in further detail with reference to an example context including an example product and an example product claim. The example product includes cobalt and the example product claim is a percentage of cobalt within a product that is mined using particular types of miners, namely, artisanal and small-scale miners (ASMs). While the example product and product claim are used herein for purposes of illustration, it is contemplated that implementations of the present disclosure can be realized with any appropriate product and product claim.

In the example context, cobalt is a key ingredient of lithium-ion batteries and is a crucial component for many modern devices. Among other countries, cobalt is mined in the Democratic Republic of the Congo (DRC), which accounts for more than 50% of the world's cobalt reserves and more than 70% of the annual global cobalt production (approximately 140,000 tons). While the majority of this cobalt is mined by large-scale mining (LSM) companies with heavy machinery, an estimated 20% of the DRC's cobalt is mined by more than 100,000 ASMs. ASM-mined cobalt is frequently considered unethical, because ASMs mine cobalt with very few safety measures and often involve child labor. However, prohibiting mining of cobalt by ASMs and excluding ASMs from the cobalt supply chain cannot be considered optimal from an ethical perspective as it could drive many people deeper into poverty.

Instead, to improve and control the labor conditions of ASMs, the DRC has opened government operated ASM mining zones, referred to as "zones d'exploration artisanale" (ZEAs). These official mines allow ASM mining where industrial mining is not feasible and aim to ensure ethical labor conditions. With ZEAs, some degree of ASM-mined cobalt in a product can be acceptable, allowing products to come with claims, such as, for example, "100% ethical cobalt containing 20% ASM cobalt from ZEAs." The verification of such claims requires provenance tracking from the product through the supply chain back to the cobalt mine. It can be assumed that public, or end consumer, verifiability increases public awareness and adds pressure to ethically source, in the example context, cobalt.

As introduced above, existing frameworks for provenance and supply chain traceability rely on distributed ledgers. Providing public verifiability using distributed ledgers is trivial. However, offering public verifiability based on confidential production details seems contradictory. Consequently, and among other issues, existing frameworks do not offer public verifiability of ratios between commodities, for example, while ensuring confidentiality of supply chain details. In the example context, and as used for purposes of illustration herein, the SCT platform of the present disclosure enables execution of the verification protocol of the present disclosure to enable verifiers (e.g., end consumers) to verify the percentage of ASM-mined cobalt in products, while ensuring confidentiality of SCD.

FIG. 1 depicts a conceptual representation of an example supply chain 100. More particularly, and continuing with the example context, the example supply chain 100 is a condensed cobalt supply chain from mined cobalt ore to refined cobalt, to electronic devices. The example supply chain 100 includes example stages of mining 102, trading 104, processing 106 (e.g., smelting, refining), component production 108, manufacturing 110, and electronics production 112. The example supply chain 100 is condensed in that such a supply chain could, in reality, contain more trading and manufacturing stages. For example, the cobalt supply chain typically includes, for example, twelve supply chain stages.

Independent of supply chain traceability solutions, the due diligence guidance promulgated by the Organization for Economic Co-operation and Development (OECD) requires on-ground assessment of SCAs by third-party auditors to ensure a minimum of ethical sourcing and human rights in the supply chain. Implementations of the present disclosure can be used as a complement to such audits by providing a channel for end consumer verification with privacy-preservation, as described herein. This verification can, for example, be triggered by scanning a machine-readable code (e.g., bar code, QR code) that is printed on the purchased product.

Implementations of the present disclosure can target scenarios that provide every end consumer with the option to verify ethical cobalt sourcing. It can be assumed, however, that, in reality, given the above-mentioned audits, only a fraction of end consumers will execute verification. In view of this, implementations of the present disclosure aim to minimize effort expended by SCAs at transaction time, while enabling verification of ethical sourcing on-demand. This on-demand approach further enables verifiers (e.g., end consumers) to determine the definition of ethical sourcing on an end product level at verification time.

In the example context, and not being limited thereto, implementations of the present disclosure focus on enabling verification of the ratio between cobalt from LSMs and ASMs in a product. That is, in the example context, a percentage of ASM-mined cobalt is provided as the example product claim that is to be verified using the SCT platform of the present disclosure. In the example context, verification is performed, while preserving confidentiality of transaction details including, for example and without limitation, the mined amounts of cobalt ore. Protecting the amounts also protects SCAs' trade secrets, such as BOMs of their products, as well as storage capacities and warehouse stock. Leaking this kind of information could put the SCAs' competitive advantages at risk and discourage participation in supply chain transparency.

The verification protocol of the present disclosure enables an arithmetic function to be executed on encrypted SCD (i.e., confidential information) for computing an ASM-mined percentage, while preserving privacy of the SCD. This computation is performed, such that no one learns the confidential SCI) that is used to compute the ASM percentage. Furthermore, the SCT platform of the present disclosure only enables the verifier to learn the output (i.e., verification of the ASM percentage).

As described in further detail herein, the privacy-preserving verification protocol executed by the SCT platform of the present disclosure references, for example and without limitation, a distributed ledger that stores all supply chain transactions. In some examples, certified SCAs, such as miners, traders, or manufacturers in the example context, write distributed ledger entries containing encrypted production details (as encrypted SCD) of the respective supply chain stages. This SCD can include valuable information, such as actor identities, asset types, and locations, for example. In the example context, miners' distributed ledger entries carry the mined amount of cobalt ore in encrypted form, as encrypted SCD, and also indicate whether it was mined by an LSM or an ASM. This information can be implicit based on the miner's identity contained in the respective distributed ledger entry. Anyone with access to the distributed ledger can read the encrypted SCD and evaluate product claims made about the products using the verification protocol of the present disclosure. Furthermore, each distributed ledger entry indicates parent-child relations, such that one can traverse the distributed ledger from a given end product all the way back to the mining entries that led to the cobalt used in the product. This enables verification of the cobalt origin and, therefore, enables provenance verification.

In some implementations, the verification protocol of the present disclosure is executed across central neutral parties, which include, a re-encryption party RI' and a decryption party DP. In the example context, the neutral parties RP and DP could be hosted and controlled by, for example, non-government organizations (NGOs) (e.g., Amnesty International, which aims to improve labor conditions and achieve ethical sourcing of cobalt). In some examples, the re-encryption party RP and the decryption party DP can each be assumed to have an intrinsic motivation to disclose misconduct in the supply chain, if there is any indication of such.

Implementations of the cryptographic protocols of the present disclosure are now described, where the index $1 \leq i \leq n$ is used for the SCAs denoted as $A_i$. Further, the index $1 \leq j \leq m$ is used to refer to the private inputs of respective parties (e.g., SCD, such as produced amounts). Without loss of generality, it is provided that the supply chain transactions are recorded to a distributed ledger. As noted herein, while distributed ledgers are discussed by way of non-limiting example, any appropriate shared data storage can be used.

Figure 2:
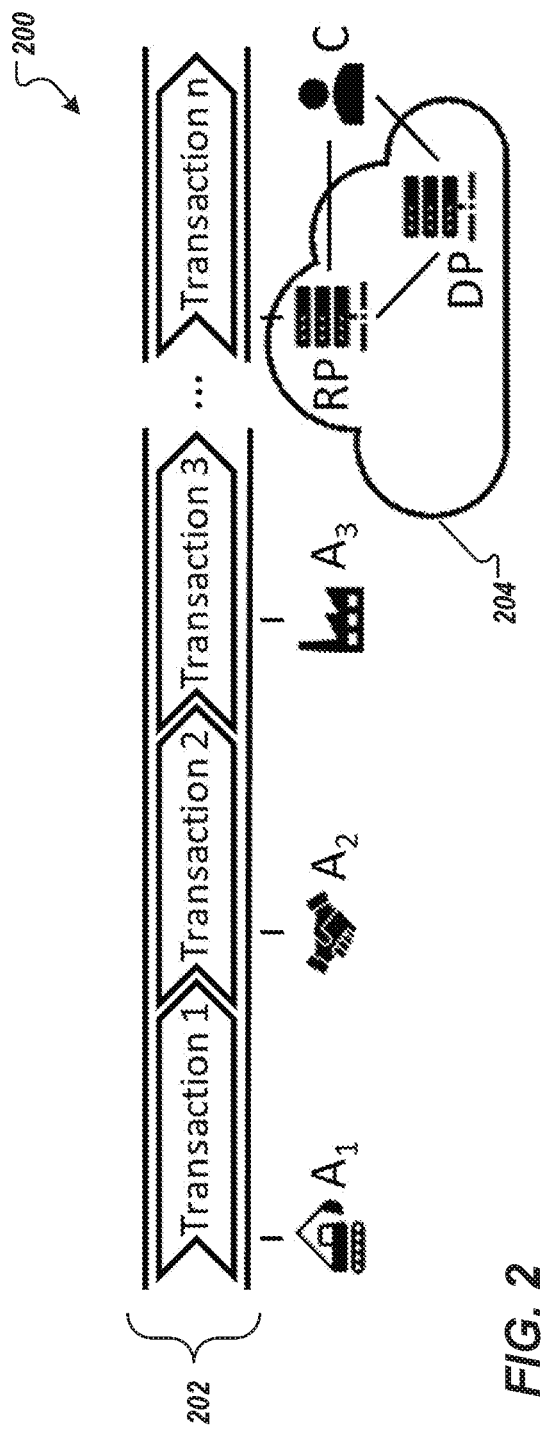
FIG. 2 depicts a conceptual architecture in accordance with implementations of the present disclosure.

FIG. 2 depicts a conceptual architecture 200 in accordance with implementations of the present disclosure. The conceptual architecture 200 includes a series of transactions 202 occurring between SCAs, denoted as $A_1, A_2, A_3$, along a supply chain. In some examples, and as described herein, each transaction in the series of transactions is encrypted (e.g., as encrypted SCD) and is recorded to a shared data storage, such as a distributed ledger. The conceptual architecture 200 includes a verifier C (e.g., an end consumer seeking to verify product claims), a re-encryption party RP (e.g., a neutral party), and a decryption party DP (e.g., a neutral party).

In some implementations, a network 204 facilitates communication between two or more of the verifier C, the re-encryption party RP, and the decryption party DP. In some examples, the network 204 can include a large computer network, such as a local area network (LAN), a wide area network (WAN), the Internet, a cellular network, a telephone network (e.g., PSTN) or an appropriate combination thereof connecting any, number of communication devices, mobile computing devices, fixed computing devices and server systems.

In some examples, the verifier C can use a client device, and each of the re-encryption party RP and the decryption party DP can provide a respective server system. In some examples, the client device includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some examples, each the server system includes at least one server and at least one data store. For example, each server system can be of various forms of servers including, but not limited to a web server, an application server, a proxy server, a network server, and/or a server pool.

In some implementations of the present disclosure, the SCT platform of the present disclosure is hosted across the network 204. For example, the client device of the verifier C can execute an application (e.g., mobile application) and/or access a web-based application (e.g., through a browser application) to initiate the verification protocol of the present disclosure. That is, the client device can be used to execute a portion of the verification protocol (e.g., send a request to the re-encryption party RP, receive a response from the decryption party DP, execute verification function calculation(s)), as described in further detail herein. As another example, the server system of each of the re-encryption party RP and the decryption party DP can execute an application to execute respective portions of the verification protocol of the present disclosure (e.g., query the distributed ledger, execute encryption, execute decryption, communicate with other parties).

In further detail, each SCA $A_i$ of the supply chain holds an instance of a cryptosystem $CS_{A_i} = (E_{A_i}, D_{A_i}, G_{A_i})$ with a secret key $sk_{A_i}$. $CS_{A_i}$ can be asymmetric or symmetric. The re-encryption party RP holds an instance of an asymmetric cryptosystem $CS_{RP} = (E_{RP}, D_{RP}, G_{RP})$ with a key pair ($pk_{RP}$, $sk_{RP}$). The decryption party DP has an asymmetric FHE cryptosystem $CS_{DP} = (E_{DP}, D_{DP}, G_{DP})$ with a key pair ($pk_{DP}$, $sk_{DP}$). Implementations of the present disclosure further include up-front key distributions. For example, the re-encryption party RP provides its $pk_{RP}$ to each SCA $A_i$ and the decryption party DP provides its $pk_{DP}$ to the re-encryption party RP and each SCA $A_1$. Each SCA $A_i$ generate a re-encryption key $rk_{A_i \rightarrow DP}$ that enables re-encryption of ciphertexts from $pk_{A_i}$ to $pk_{DP}$. Each SCA $A_i$ sends this re-encryption key to the re-encryption party RP. In some examples, the key distribution is executed over secure (i.e., secret and authentic) channels between each two parties that are to exchange key information. For example, key distribution can be achieved over the Internet using Transport Layer Security (TLS). In some examples, secure channels can be emulated on the distributed ledger using public-key cryptography.

Each SCA encrypts its SCD using its respective encryption key. In the example of FIG. 2, the verifier C seeks to verify authenticity of a product claim. The cryptographic protocol of the present disclosure is executed among the consumer C, a re-encryption party RP, and a decryption party DP to verify the product claims. In some examples, each transaction refers one or more previous transactions that were used in the respective supply chain stage(s). In this manner, a verifier, such as the consumer C, can determine which lots were used by all producers that were involved in the production throughout the supply chain, from the sourcing of the crude materials (e.g., metal ore), to the processing of the materials to the production of the final product.

Figure 3:
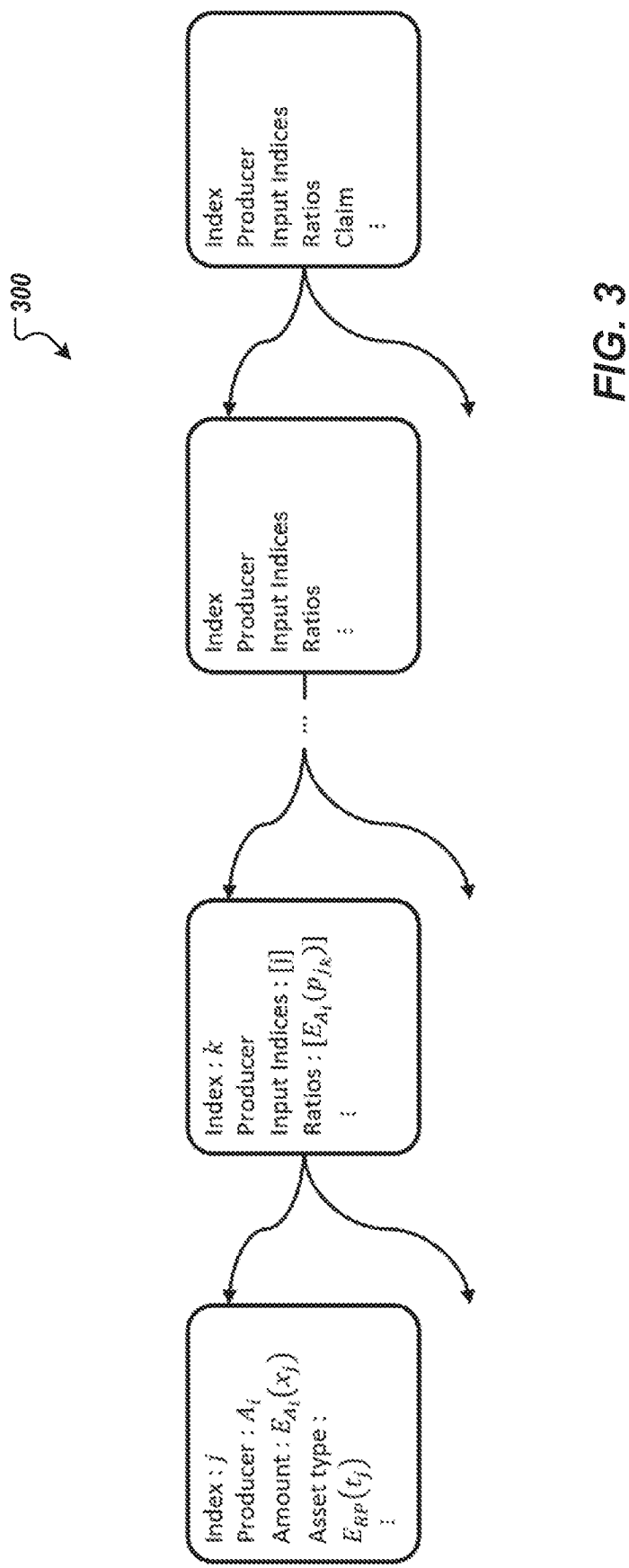
FIG. 3 depicts an example set of entries to a distributed ledger in an example supply chain.

FIG. 3 depicts an example set of entries 300 to a distributed ledger in an example supply chain. In the example of FIG. 3, each entry includes an index, an identifier of a respective SCA $A_i$ (also referred to as a producer), a list of indices pointing to entries that they were created from (e.g., input lot numbers), except for the initial entry, and, in this example, a list of ratios indicating what percentage of each input lot was used. In some examples, the first entry of the supply chain is referred to as a sourcing entry and includes an encrypted amount and an encrypted asset type, but no list of previous entries or input ratios. In some examples, the last entry of the supply chain is referred to as the manufacturer entry and includes a product claim (e.g., a specific asset type ratio). The set of entries 300 enables tracing of supply chain entries by traversing distributed ledger along the pointers, as described in further detail herein.

FIG. 4 depicts a verification protocol 400 in accordance with implementations of the present disclosure. The verification protocol 400 is executed in an effort to verify whether a product claim ($\rho_{CLAIM}$) is true. In some examples, communication between parties (e.g., C, RP, DP) is performed over secure channels, such as Transport Layer Security (TLS).

In the example of FIG. 4, the verification protocol 400 is initiated with the verifier C sending an index $\theta$ of the distributed ledger entry it wants to verify to the re-encryption party RP (line 1). In this example, the claim made in this entry specifies a verification function $f(\cdot)$. The verifier C also sends a random number $r_0$ (used for blinding the verification result later in the protocol) to the re-encryption party RP (line 2). For example, the verifier C can use the client device (e.g., smartphone) to scan a machine-readable code (e.g., bar code, QR code) of a product having one or more product claims that are to be verified. In some examples, an application executed on the client device decodes the machine-readable code to determine the index $\theta$ and generates the random number $r_0$. In some examples, the application initiates transmission of the index $\theta$ and the random number $r_0$ from the client device to the server system operated by, or on behalf of, the re-encryption party RP. In some examples, the client device can encrypt the random number $r_0$ using a public encryption key of the decryption party DP. In some examples, the random number $r_0$ is sent as plain-text (e.g., unencrypted except for any encryption over the communication channel, such as TLS).

In some examples, the re-encryption party RP traverses the distributed ledger and reads the encrypted amounts from the required distributed-ledger entries, encrypted under the encryption keys of the respective SCAs, traverses the distributed ledger and reads all encrypted ratios from the required distributed-ledger entries encrypted under the encryption keys of the respective SCAs, and traverses the distributed ledger and reads the encrypted asset types from the required distributed-ledger entries, encrypted under the public key of the re-encryption party RP (lines 3-5).

For each j, the re-encryption party RP re-encrypts the amount ciphertext to obtain the amount encrypted under the public key of the decryption party DP (line 6). For each j, the re-encryption party RP re-encrypts the k ratio ciphertexts to obtain the ratios encrypted under the public key of the decryption party DP (line 7). For each j, the re-encryption party RP decrypts the asset type (line 8). For each j, the re-encryption party RP homomorphically combines all ratios $p_{j_k}$, that correspond to the same sourcing entry of index j (line 9). This is done by homomorphically multiplying the encrypted ratios. The result is the encrypted percentage of the j-th sourced amount that was used to produce the product described in the entry θ. This is done for each j individually.

For each t, the re-encryption party RP homomorphically computes the encrypted weighted sum of all amounts that have the same asset type t using the ratios computed (in line 9) as weights (line 10). For each t, the re-encryption party RP samples two random values $r_{1_t}$, $r_{2_t}$ such that $0 < r_{2_t} \ll r_{1_t}$ (line 11). For each t, the re-encryption party RP homomorphically computes the encrypted blinded sum using the random values $r_{1_t}$, $r_{2_t}$ for additive and multiplicative blinding (line 12). For each t, the re-encryption party RP sends the encrypted blinded sum to the decryption party DP (line 13).

For each t, the decryption party DP decrypts the blinded sum (line 14). For each t, the decryption party DP multiplicatively inverts the blinded sum (line 15). For each t, the decryption party DP encrypts the multiplicative inverse of the sum with its public key end sends the resulting ciphertext to the re-encryption party RP (line 16).

For each t, the re-encryption party RP homomorphically multiplies the encrypted inverse by $r_{1_t}$ (line 17). This causes the multiplicative blinding to cancel out. Given that $r_{2_t} \ll r_{1_t}$, the value $S_t^{-1}$ is an approximate multiplicative inverse of $S_t$ due to the noise caused by the additive blindings with $r_{2_t}$ (see line 12). However, as long as each $r_{1_t}$ is exponentially larger than the corresponding (positive) $r_{2_t}$ (i.e., $0 < r_{2_t} \ll r_{1_t}$), the multiplicative blinding $r_{1_t}$ cancels out and the effect of $r_{2_t}$ on the inverse sum $S_t^{-1}$ is negligible. Consequently, the difference between the approximate inverse and the actual inverse is negligibly small.

The re-encryption party RP computes the verification function $f(\bullet)$ based on the encrypted sums and their inverses (line 18). Given the additive and multiplicative homomorphisms of FHE schemes, the verification function can be any arithmetic function computed over the sums $S_t$ (e.g., addition, subtraction, multiplication, division) The verification function evaluated over encrypted inputs yields the verification result in encrypted form ($E_{DP}(\rho)$). The re-encryption party RP takes the encrypted output of the verification function, $E_{DP}(\rho)$, and additively blinds it by homomorphically adding the $r_0$ (line 19). The result is denoted as $E_{DP}(\rho')$. The re-encryption party RP sends the encrypted blinded result $E_{DP}(\rho')$ to the decryption party DP (line 20).

The decryption party DP decrypts the blinded result of the verification function (line 21) and sends the blinded result ($\rho'$) to the verifier C (line 22). The verifier C computes the final result ($\rho$) by subtracting $r_0$ (line 23), which the verifier C had provided (see line 2). If the value of the product claim ($\rho_{CLAIM}$) is equal to or approximately equal to $\rho$ (i.e., $\rho \approxeq \rho_{CLAIM}$), it can be determined that the product claim ($\rho_{CLAIM}$) is true. In some examples the product claim is determined to be approximately equal to the final result, if a difference between the product claim and the final result is less than a threshold difference. In some examples the product claim is determined to be approximately equal to the final result, if a percentage difference between the product claim and the final result is less than a threshold percentage difference.

Depending on the particular FHE scheme used, multiplication by $r_{1_t}$ (see line 17 of FIG. 4) can be performed as ciphertext-plaintext multiplication, which typically is more efficient. Similarly, depending on the FHE scheme used, addition by $r_{2_t}$ (see line 12 of FIG. 4) and by $r_0$ (see line 19 of FIG. 4) can be performed as ciphertext-plaintext addition, which typically is more efficient. The verification protocol of the present disclosure is parallelizable. For example, two or more operations that are performed for each t, j, k, including re-encryptions, encryptions, decryptions, homomorphic additions, homomorphic multiplications, and the like, can be performed independently in parallel.

Implementations of the present disclosure also consider privacy-performance-tradeoffs. As one example, if the number of different asset types is very small (e.g., a dozen or less), first optimizations can be applied to improve confidentiality of the asset type at the cost of a higher computation complexity. As another example, if percentages that indicate ratios between different parent entries are not confidential, second optimizations can be applied to reduce the size of the ledger entries and the computation complexity. In some examples, a combination of both the first optimizations and the second optimizations can be provided.

With regard to the first optimizations, instead of encrypting the amount of the respective asset and the asset type in a sourcing entry, producers (SCAB) can encrypt the amounts of each particular asset that could have been sourced in the respective sourcing step. For example, if only a single asset was sourced, the distributed ledger entry contains one ciphertext that encrypts the amount of this asset and the other ciphertexts are just encrypted as 0. Even though this increases the number of involved ciphertexts linearly in the number of asset types, it also prevents the re-encryption party RP from learning what asset was sourced in a sourcing step, and therefore provides a higher level of confidentiality. The resulting tradeoff between privacy and performance implies that this protocol is more efficient for smaller numbers of asset types.

Figure 5:
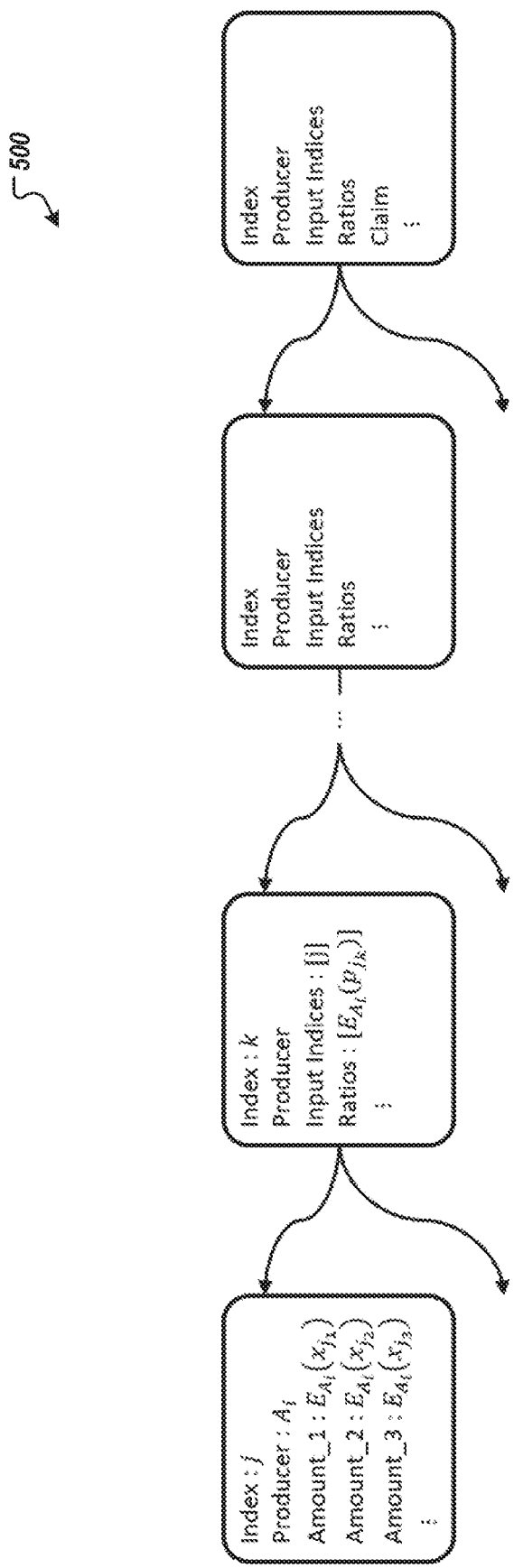
FIG. 5 depicts an example set of entries to a distributed ledger in an example supply chain.

FIG. 5 depicts an example set of entries 500 to a distributed ledger in an example supply chain. The example set of entries 500 reflects the first optimizations relatively few asset types). That is, the example set of entries 500 reflects a limited number of asset types, in this example, entries include an index, an identifier of a respective SCA (producer), a list of identifiers pointing to entries that they were created from (input lot numbers), and a list of ratios indicating what percentage of each input lot was used. Sourcing entries (i.e., the first entries of the supply chain) include an encrypted amount for each asset type, but is absent a list of previous entries and input ratios. Manufacturer entries (i.e., the last entry of the supply chain) includes a product claim (e.g., a specific asset-type ratio).

Figure 6:
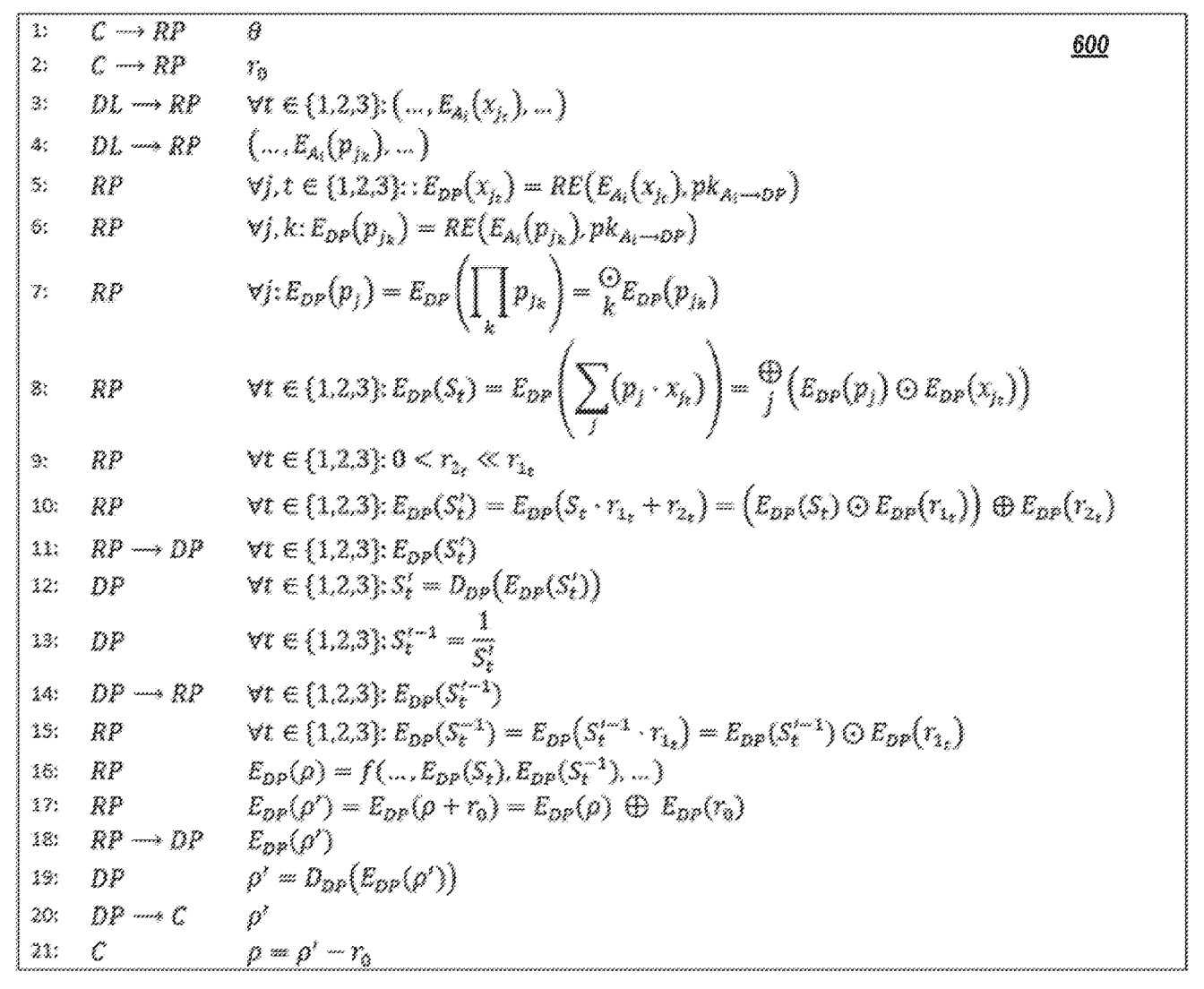

FIG. 6 depicts a verification protocol 600 for a limited number of asset types in accordance with implementations of the present disclosure. That is, the verification protocol 600 reflects the first optimizations and an example of three (3) asset types. Examples of the first optimizations include absence of entry look-ups in the distributed ledger (e.g., line 5 of FIG. 4) and absence of decryption operations (e.g., line 8 of FIG. 4). In some examples, communication between parties (e.g., C, RP, DP) is performed over secure channels, such as TLS.

With regard to the second optimizations, if the ratios between confidential amounts are not confidential information themselves, the computation of the weighted sums can be simplified. More particularly, instead of performing ciphertext-ciphertext multiplications (see lines 9 and 10 of FIG. 4), more efficient plaintext-plaintext and ciphertext-plaintext multiplications can be performed. This also renders the re-encryption of the percentages unnecessary (see line 7 of FIG. 4). A combination of both encrypted percentages and plaintext percentages is possible. This satisfies scenarios where different supply chain stages or SCAs have different confidentiality requirements.

Figure 7:
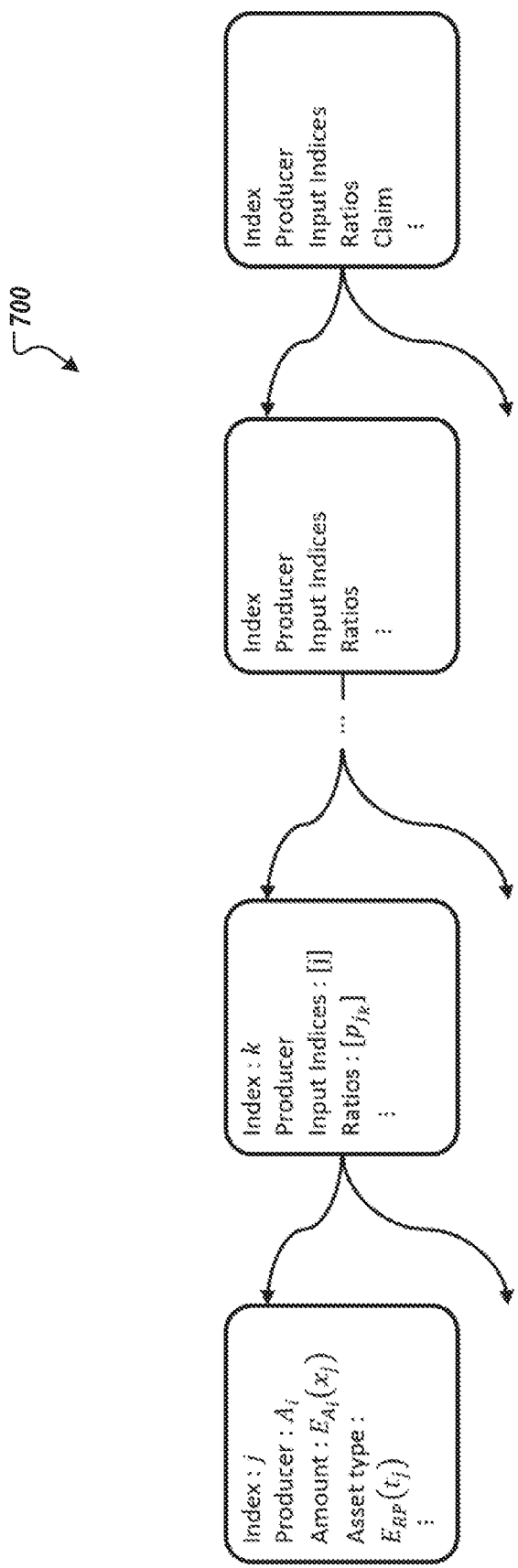
FIG. 7 depicts an example set of entries to a distributed ledger in an example supply chain.

FIG. 7 depicts an example set of entries 700 to a distributed ledger in an example supply chain. The example set of entries 700 reflects the second optimizations (i.e., non-confidential ratios). That is, the example set of entries 700 includes plaintext SCD (i.e., not encrypted). For example, the ratios $p_{j_k}$ are provided in plaintext not encrypted).

FIG. 8 depicts a verification protocol 800 for plaintext ratios in accordance with implementations of the present disclosure. That is, the verification protocol 800 reflects the second optimizations. Examples of the second optimizations include absence of ciphertext-ciphertext multiplications (see lines 9 and 10 of FIG. 4) and provides more efficient plaintext-plaintext multiplications (see line 8 of FIG. 8) and ciphertext-plaintext multiplications (see line 9 of FIG. 8). This also renders the re-encryption of the percentages unnecessary (see line 7 of FIG. 4). In some examples, communication between parties (e.g., C, RP, DP) is performed over secure channels, such as TLS.

Implementations of the present disclosure are now described in further detail with reference to the example context of ASM-mined cobalt introduced above.

Figure 9:
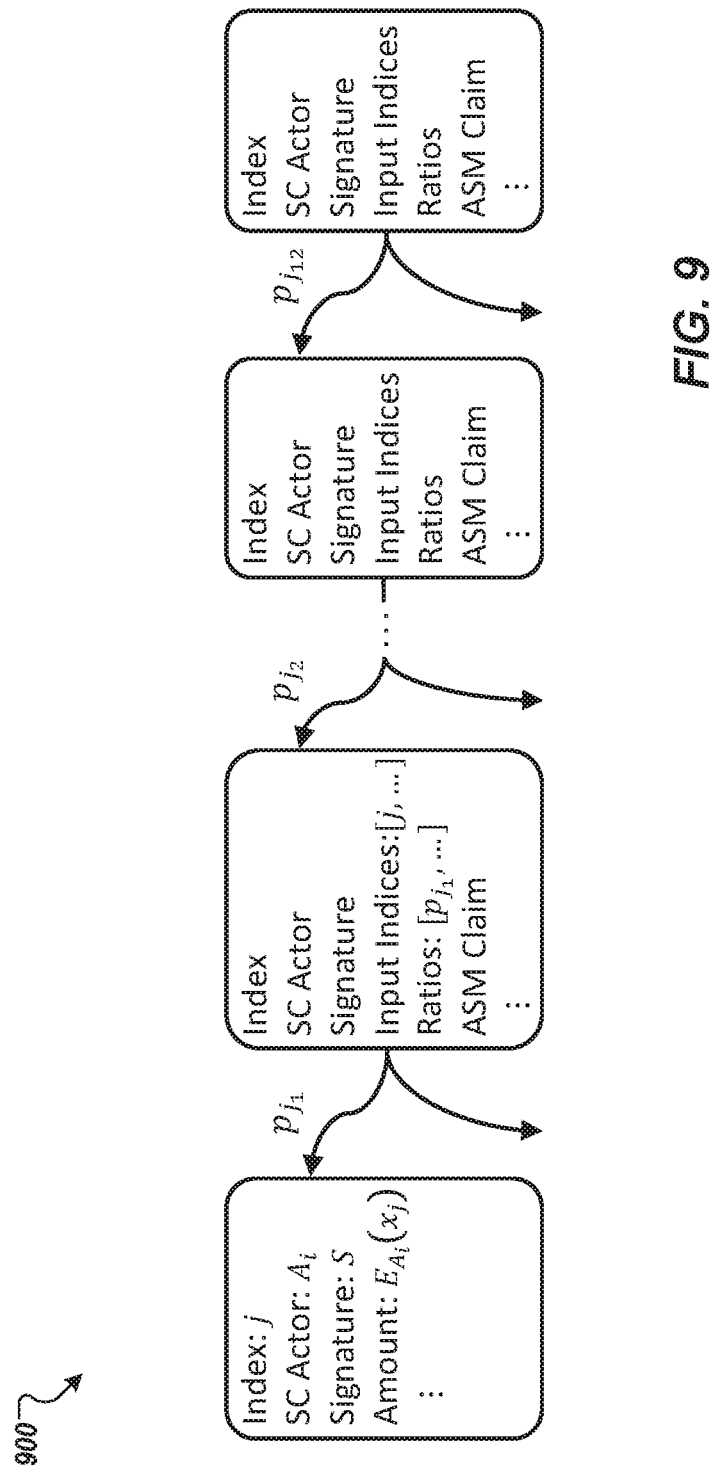
FIG. 9 depicts an example set of entries to a distributed ledger in an example supply chain.

FIG. 9 depicts an example set of entries 900 to a distributed ledger in an example supply chain for products that include cobalt (e.g., smartphones). In some examples, each entry corresponds to a transaction executed along the supply chain and recorded to the distributed ledger. As depicted in FIG. 9, and in accordance with implementations of the present disclosure, each entry includes an index, producer identifier, a list of IDs pointing to entries that the entry was created from (e.g., input lot numbers), and, for the example context, a list of ratios indicating what percentage of each input lot was used. In some examples, a sourcing entry is provided as the first entry of the supply chain and includes an encrypted amount and an encrypted asset type (e.g., encrypted SCD), but is absent a list of previous entries and input ratios. In some examples, a manufacturer entry is provided as the last entry of the supply-chain and includes a product claim (e.g., a specific asset-type ratio).

With particular reference to the example context, and as noted above, each entry refers to its parent entries (except for the sourcing entry). These parent-child relations between supply chain transactions indicate, in the example context, which cobalt lots, commodities, or components a product is composed of. This enables tracing of the origin of cobalt lots by traversing the distributed ledger along the indices pointing to parent entries. In the example context, a distinction is made between different types of entries, namely, ordinary entries and mining entries. Each entry contains a unique index j, a unique actor identifier $A_i$, and a signature (e.g., cryptographic signature) proving that this entry was in fact written by $A_i$. Additional details such as timestamps, locations, assets types, and the like can be included.

In some examples, mining entries are provided as source entries (i.e., the initial entries of the supply chain) and additionally include an encrypted amount $x_j$ of sourced cobalt ore recorded as encrypted SCD. To enable light-weight mining entries, this encrypted amount can be published off-ledger (e.g., using distributed hash tables). The unique identifier $A_i$ of the respective SCA implicitly tells whether this amount was sourced by an LSM or an ASM. In contrast to mining entries, all other entries additionally contain a list of indices pointing to parent entries that they were derived from as well as a list of parent-child ratios and a claim about the ASM percentage. The list of ratios contains one percentage value for each parent entry that the current entry points to. This enables ratios between different lots of cobalt ore to be taken into consideration and therefore incorporates mixing of ingredients in the various supply chain stages (e.g., such as in recipes). If all percentage values assigned to the parent-child references of the supply chain stages from an end product all the way back to a particular mined amount of cobalt ore are multiplied, the proportion of this particular mined amount of cobalt ore in the end product can be determined.

In the example context, amounts of ASM-mined cobalt ore are denoted by $x_{j_{ASM}}$ and amounts of LSM-mined cobalt ore are denoted by $x_{j_{LSM}}$. Whether a mined amount $x_j$ is an ASM-mined amount (i.e., $x_{j_{ASM}}$) or a LSM-mined amount (i.e., $x_{j_{LSM}}$) is implicit in the identity $A_i$ of the respective miners written in the mining entry since a miner is either an ASM or an LSM.

With regard to verification, in a dialog-like manner, the verifier C (e.g., an end consumer that wants to verify a product claim) and the re-encryption party RP and the decryption party DP jointly verify the product claim (e.g., claimed ASM-mined percentage). As described in further detail herein, the parties traverse distributed ledger entries that have previously been written by SCAs $A_i$ and read encrypted SCD mined amounts of LSM and ASM cobalt ore that led to the cobalt which was used to manufacture the product). These ciphertexts are re-encrypted under the same key and are used in computations.

In accordance with implementations of the present disclosure, use of the re-encryption party RP and the decryption party DP enables SCD to be encrypted by SCAs using their individual encryption keys and be used for product claim verification. These individual encryption keys prevent unauthorized SCAs, or other parties, from reading confidential SCD. In further detail, and as described herein, homomorphic encryption enables processing of SCD (e.g., mined amounts) in encrypted form, and therefore guarantees a high level of confidentiality throughout the verification of the product claim (e.g., ASM-mined percentage).

In some implementations, the product claim can be expressed as or transferred into an arithmetic function. For example, for verification of the product claim, a computation of the verification function $\rho = f(\ldots, x_j, \ldots)$ is executed. In some examples, the verification function computes a numerical value a percentage of a particular metal in an alloy). In the example context, the re-encrypted ciphertexts are used to compute a total ASM amount and a total LSM amount, and to compute the ASM-mined percentage using, for example, the following verification function:

$$\rho = \frac{\sum_{j=1}^{m} x_{j_{ASM}}}{\sum_{j=1}^{m} x_{j_{ASM}} + \sum_{j=1}^{m} x_{j_{LSM}}}$$

Prior to execution of the verification protocol of the present disclosure, and in the example context, in the j-th mining step, miner $A_i$ encrypts the sourced amount $x_j$ with $pk_{A_i}$ and obtains the ciphertext $E_{A_i}(x_j)$. The miner $A_i$ publishes $E_{A_i}(x_j)$ to an entry in the distributed ledger together with the index j, the identifier $A_i$, and a signature for the entry. Later supply chain stages that use the cobalt ore mined in this stage refer to the index j as a parent entry.

FIG. 10 depicts an example verification protocol 1000 in accordance with implementations of the present disclosure. The example of FIG. 10 represents the example context of verifying a percentage ASM-mined cobalt. It is appreciated, however, that the verification protocol of the present disclosure can be used for verification of any appropriate product claim, as described herein. In some examples, communication between parties (e.g., C, RP, DP) is performed over secure channels, such as TLS.

In the example of FIG. 10, the verification protocol 1000 starts with the verifier C sending (line 1) to the re-encryption party RP the index θ of the distributed ledger entry that corresponds to the product having a product claim that is to be verified. Additionally, the verifier C generates and sends random numbers $r_1, r_2 \in \mathcal{M}_{DP}$ (line 2), which will be used for blinding the outputs that the verifier C receives later in the verification protocol. For example, the verifier C can use the client device (e.g., smartphone) to scan a machine-readable code (e.g., bar code, QR code) of a product having one or more product claims that are to be verified. In some examples, an application executed on the client device decodes the machine-readable code to determine the index θ and generates the random numbers $r_1, r_2$. In some examples, the application initiates transmission of the index θ and the random numbers $r_1, r_2$ from the client device to the server system operated by, or on behalf of, the re-encryption party RP.

In response to receiving at least the index θ, the re-encryption party RP traverses the distributed ledger DL starting from entry θ back to the mining entries that were used to create the product and reads the encrypted amounts corresponding to these entries (line 3). That is, for example, the re-encryption party RP queries the distributed ledger DL and receives respective responses from the distributed ledger DL. The encrypted amounts are denoted as $E_{A_i}(x_j)$ with 1≤j≤m in for in mining entries. During traversal of the distributed ledger, the re-encryption party RP reads the parent-child percentage values $p_{j_k}$ for each parent-child relation (line 4). The re-encryption party RP re-encrypts the encrypted amounts and obtains the amounts encrypted using the public key of the decryption party DP (line 5). The re-encryption party RP multiplies all parent-child percentage values that correspond to the same mining entry (e.g., $p_{j_1}, \ldots, p_{j_k}, \ldots, p_{j_d}$) for supply chain depth d (line 6). As noted above, the cobalt supply chain can have, for example, twelve stages, such that each mining entry has up to eleven child entries. Consequently, d can be set to be less than or equal to 11 in this non-limiting example. The overall percentage that a mined amount $x_j$ accounts for in a product is denoted as $p_j$.

The re-encryption party RP homomorphically weights the encrypted mined amounts $x_j$ by their percentages $p_j$. The re-encryption party RP homomorphically computes the encrypted weighted sum of the ASM cobalt ore amounts and the encrypted weighted total amount (i.e., ASM plus LSM amounts) (lines 7 and 8). The resulting encrypted weighted sums are denoted as $E_{DP}(S_{ASM})$ and $E_{DP}(S_{Total})$, respectively.

The re-encryption party RP samples two random numbers $r_3, r_4$ s.t. $0 < r_4 \ll r_3 \in \mathcal{M}_{DP}$. These random numbers are used to additively and multiplicatively blind the encrypted sums $S_{ASM}$ and $S_{Total}$ (lines 9 and 10). In some examples, r is exponentially larger than (the positive) $r_4$ (i.e., $0 < r_4 \ll r_3$), such that the multiplicative blindings with $r_3$ preserve the ratio between $S_{ASM}$ and $S_{Total}$. As described herein, use of the random numbers ensure that the consumer C learns only the ratio rather than the exact sums of mined amounts. The resulting encrypted blinded sums are denoted as $E_{DP}(S'_{ASM})$ and $E_{DP}(S'_{Total})$, respectively.

The re-encryption party RP adds a second blinding layer to each sum by homomorphically adding the previously received $r_1$ and $r_2$, and sends the resulting encrypted, double-blinded sums $E_{DP}(S''_{ASM})$ and $E_{DP}(S''_{Total})$ to the decryption party DP (lines 11 and 12). By blinding the sums with $r_1$ and $r_2$, the decryption party DP is prevented from learning the ASM-mined percentage. The decryption party DP decrypts the blinded sums and forwards the resulting blinded plaintexts to the verifier C (lines 13 and 14). For example, the application executing on the server system of the decryption party DP initiates transmission of the blinded plaintexts to the client device of the verifier C.

In some examples, in response to receiving the blinded plaintexts, the application executing on the client device of the verifier C removes the additive blinding values $r_1$ and $r_2$ by subtraction and divides the resulting $S'_{ASM}$ by $S'_{Total}$ (line 15). This quotient can be compared to the claimed ASM-mined percentage to determine whether the claim is correct. Here, the $r_3$'s in the quotient cancel out, and the effect of $r_4$ renders factorization attacks to extract the sums infeasible. Consequently, and in the example context, the verifier C only learns the percentage ρ of ASM-mined cobalt. In some examples, the percentage is an approximate result due to noise caused by the additive Windings with $r_4$. However, given that $0 < r_4 \ll r_3$, the difference between p and the actual ASM-mined percentage is negligibly small.

Implementations of the verification protocol of the present disclosure can be evaluated on both a theoretical basis and an empirical basis. Theoretical evaluation and empirical evaluation of the verification protocol 1000 of FIG. 10 are described in further detail herein. That is, the theoretical evaluation and empirical evaluation discussed herein is based on the example context of FIGS. 9 and 10 and related description.

With regard to theoretical evaluation, this is provided for an asymptotic runtime and applying Landau natation. As introduced above, the number of private inputs is denoted by m with index 1≤j≤m. It can be stated that the verification protocol 1000 has runtime in $\mathcal{O}(m)$. To prove this, different types of computations applied in lines 1-15 of the verification protocol 1000 are individually analyzed. In particular, it can be stated that each step has runtime in $\mathcal{O}(m)$, where $\mathcal{O}(1) \propto \mathcal{O}(m)$. Note that, if true, the runtime of the verification protocol 1000 is also in $\mathcal{O}(m)$. Further, a base assumption is constant size of encryption keys and distributed ledger entries (e.g. $|x_j|, |sk|, |pk| \in \mathcal{O}(1)$).

Accordingly, it is seen that the encryption and the decryption of s messages of constant size is done in $\mathcal{O}(s)$, the transmission of a message of size s is done in $\mathcal{O}(s)$, generating s random numbers is done in $\mathcal{O}(s)$, and the homomorphic addition and the homomorphic multiplication of s terms is done in $\mathcal{O}(s)$. In view of this, every step that includes only these computations has runtime in $\mathcal{O}(m)$. This leaves lines 6 and 15 to be considered. Due to the constant supply chain depth of twelve stages for cobalt (discussed above), line 6 involves the multiplication of $\mathcal{O}(m)$ plaintext entries. Line 15 involves three plaintext operations. Consequently, the plaintext computations in lines 6 and 15 have runtime in $\mathcal{O}(m)$. In view of this, the verification protocol 1000 has runtime in $\mathcal{O}(m)$.

With regard to empirical evaluation, an empirical analysis of the verification protocol 1000 of FIG. 10 was performed to investigate whether the linear asymptotic runtime also ensures linear seal ability. Moreover, practical applicability of the verification protocol 1000 was tested. The empirical analysis included computing ASM-mined cobalt percentages and comparing them to the actual ASM-mined cobalt percentages encrypted in mining entries. This enables verification of whether the effect of the additive noise $r_4$ in lines 9 and 10 is negligible.

To perform the empirical analysis, a prototype was constructed in Go and C++ and used the FHE scheme BFV implemented in the PALISADE library, which offers re-encryption capabilities. It is contemplated, however, that any implementation of an FHE scheme that provides re-encryption can be used. Where possible, more efficient ciphertext-plaintext operations were used (e.g., lines 7 and 8). A plaintext size of 59 bits and a security level of 128 bits were used, and remaining BFV scheme parameters were set as suggested in *Homomorphic Encryption Security Standard*, Tech. rep. Toronto, Canada: HomomorphicEncryption.org, 2018. The 59-bit plaintexts can carry the annual global cobalt production in kilograms (28 bits) together with the blinding values $r_1, r_2, r_3, r_4$ (20-30 bits). As the distributed ledger, a permissionless Multichain was used, which ensures compatibility with the Bitcoin ecosystem. Ciphertexts were stored off-ledger and caching was used to improve scalability of ledger traversal. The re-encryption party RP, the decryption party DP, and the verifier C were distributed in different locations across Europe. The re-encryption party RP and the decryption party DP were each equipped with 32 3.1 GHz vCPUs, while the verifier C ran on a machine with two 2.2 GHz vCPUs and 2 GB memory to represent end consumer devices. The total verification runtime $t_{total}(m)$ was measured, as well as the time $t_{3-8}(m)$ spent on traversing the ledger, loading the ciphertexts, and computing the weighted sums (lines 3-8), both for $m \in \{100,250,400,550, 700,850,1000\}$ encrypted ASM and LSM amounts. The ASM percentage was set to 20%.

The measured runtimes revealed that the total protocol runtime grows linearly in m. ASM percentage computation for 1000 mining entries took 3.50 s, while 100 ciphertexts were processed in 756 ms. The majority of that time is spent on traversing the distributed ledger, loading the ciphertexts, and computing the weighted sums, represented by $t_{3-8}(m)$. These computations are highly parallelizable and therefore benefit from more computational power. The remaining time is spent on constant-time operations and communications.

Furthermore, the ASM percentage computed by the verification protocol 1000 was analyzed. Here, ASM percentages were computed for multiple protocol executions. In most cases, the computed ASM percentage deviated less than 0.05 from the actual 20% encrypted in the mined amounts. Consequently, the effect of the noise used for protecting the summed amounts against factorization attacks is, in fact, negligible. (liven the linear scalability and the fact that 1000 ciphertexts can be processed in just 3.50 s, the verification protocol 1000 is suitable for practical application. In the light of current efforts to increase efficiency of FHE schemes and their implementations, verification runtime can be assumed to decrease even further.

Figure 11:
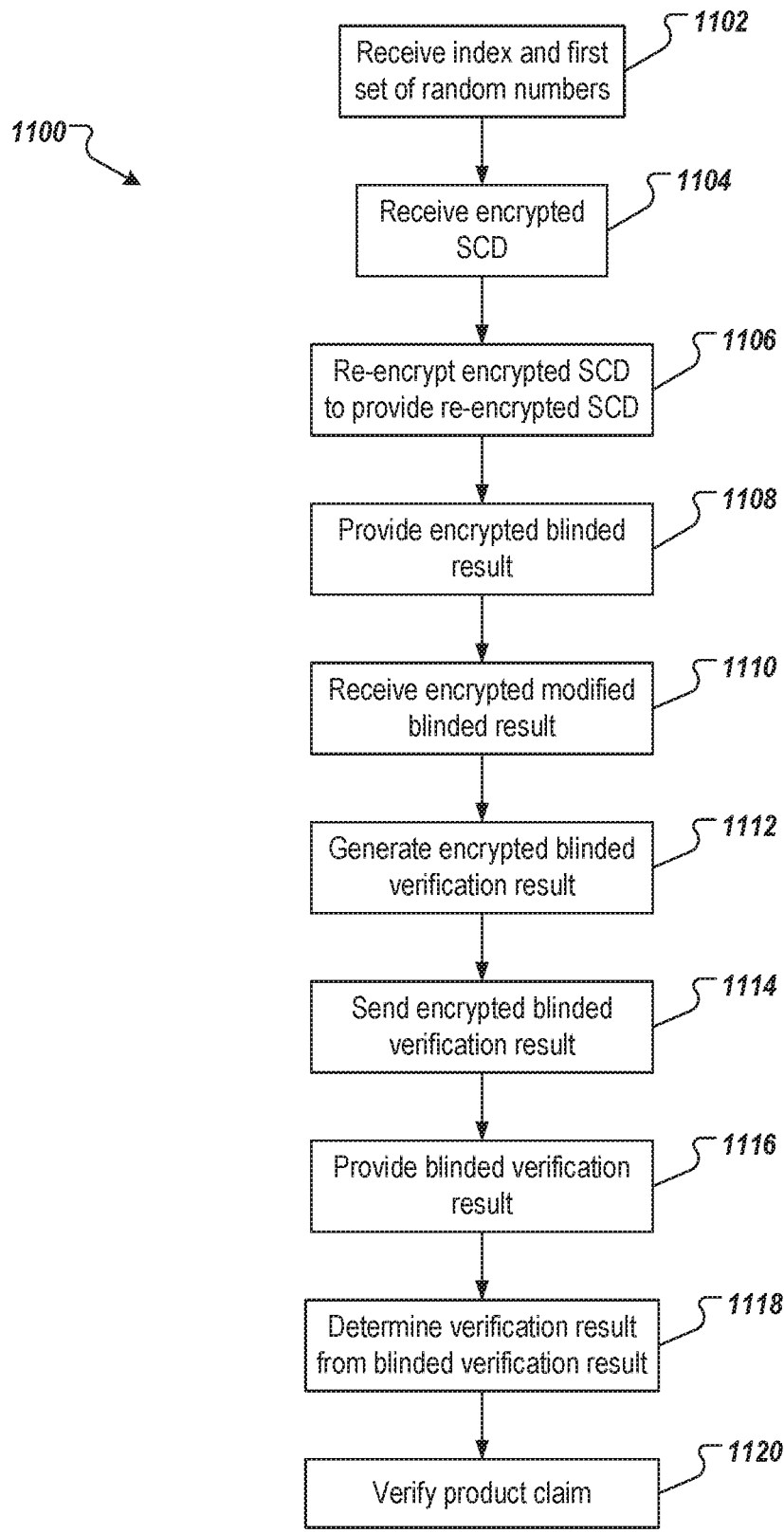
FIG. 11 depicts an example process that can be executed in accordance with implementations of the present disclosure.

FIG. 11 depicts an example process 1100 that can be executed in accordance with implementations of the present disclosure. In some examples, the example process 1100 is provided using one or more computer-executable programs executed by one or more computing devices.

An index and a first set of random numbers are received (1102). For example, and as described herein, a system of a re-encryption party RP receives an index and a first set of random numbers from a computing device of a verifier C, the first set of random numbers comprising one or more random numbers (see, e.g., lines 1 and 2 of FIG. 4). Encrypted SCD is received (1104). For example, and as described herein, the system of the re-encryption party RP receives the encrypted SCD of a SCA from a shared data storage (see, e.g., lines 3-5 of FIG. 4). In some examples, the shared data storage is a distributed ledger.

The encrypted SCD is re-encrypted to provide re-encrypted SCD (1106). For example, and as described herein, the encrypted SCD is re-encrypted under a public key of a decryption party DP to provide the re-encrypted SCD (see, e.g., lines 6 and 7 of FIG. 4). An encrypted blinded result is provided (1108). For example, and as described herein, the system of the re-encryption party executes one or more homomorphic operations on the re-encrypted SCD to provide an encrypted blinded result using a second set of random numbers (see, e.g., lines 9-12 of FIG. 4).

An encrypted modified blinded result is received (1110). For example, and as described herein, the system of the re-encryption party RP receives the encrypted modified blinded result from a system of the decryption party DP (see, e.g., line 16 of FIG. 4). In some examples, and as described in further detail herein, the system of the decryption party DP generates the encrypted modified blinded result by: receiving the encrypted blinded result from the system of the re-encryption party RP, decrypting, using a secret decryption key of the decryption party DP, the encrypted blinded result to provide a blinded result, executing a mathematical operation on the blinded result to provide a modified blinded result, and encrypting the modified blinded result using the public encryption key of the decryption party DP to provide the encrypted modified blinded result (see, e.g., lines 13-16 of FIG. 4).

An encrypted blinded verification result is generated (1112). For example, and as described herein, the encrypted blinded verification result is generated by the system of the re-encryption party RP using a verification function, the encrypted blinded result, the encrypted modified blinded result, and the first set of random numbers. In some examples, the encrypted blinded verification result is generated by providing an encrypted verification result from the verification function and executing at least one homomorphic operation on the encrypted verification result using the first set of random numbers to provide the encrypted blinded verification result (see, e.g., lines 17-19 of FIG. 4).

The encrypted blinded verification result is sent (1114). For example, and as described herein, the encrypted blinded verification result is sent from the system of the re-encryption party RP to the system of the decryption party DP (see, e.g., line 20 of FIG. 4). A blinded verification result is provided (1116). For example, and as described herein, the system of the decryption party decrypts the encrypted blinded verification result to provide the blinded verification result (see, e.g., line 21 of FIG. 4). A verification result is determined from the blinded verification result (1118). For example, and as described herein, the system of the decryption party DP send the blinded verification result to the computing device of the verifier C, the computing device determining the verification result based on the blinded verification result and the first set of random numbers, and comparing the verification result to the product claim (see, e.g., lines 22 and 23 of FIG. 4). The product claim is verified (1120). For example, and as described herein, the verifier C can compare the verification result to the product claim and determine whether the verification result and the product claim are equal (or approximately equal).

Figure 12:
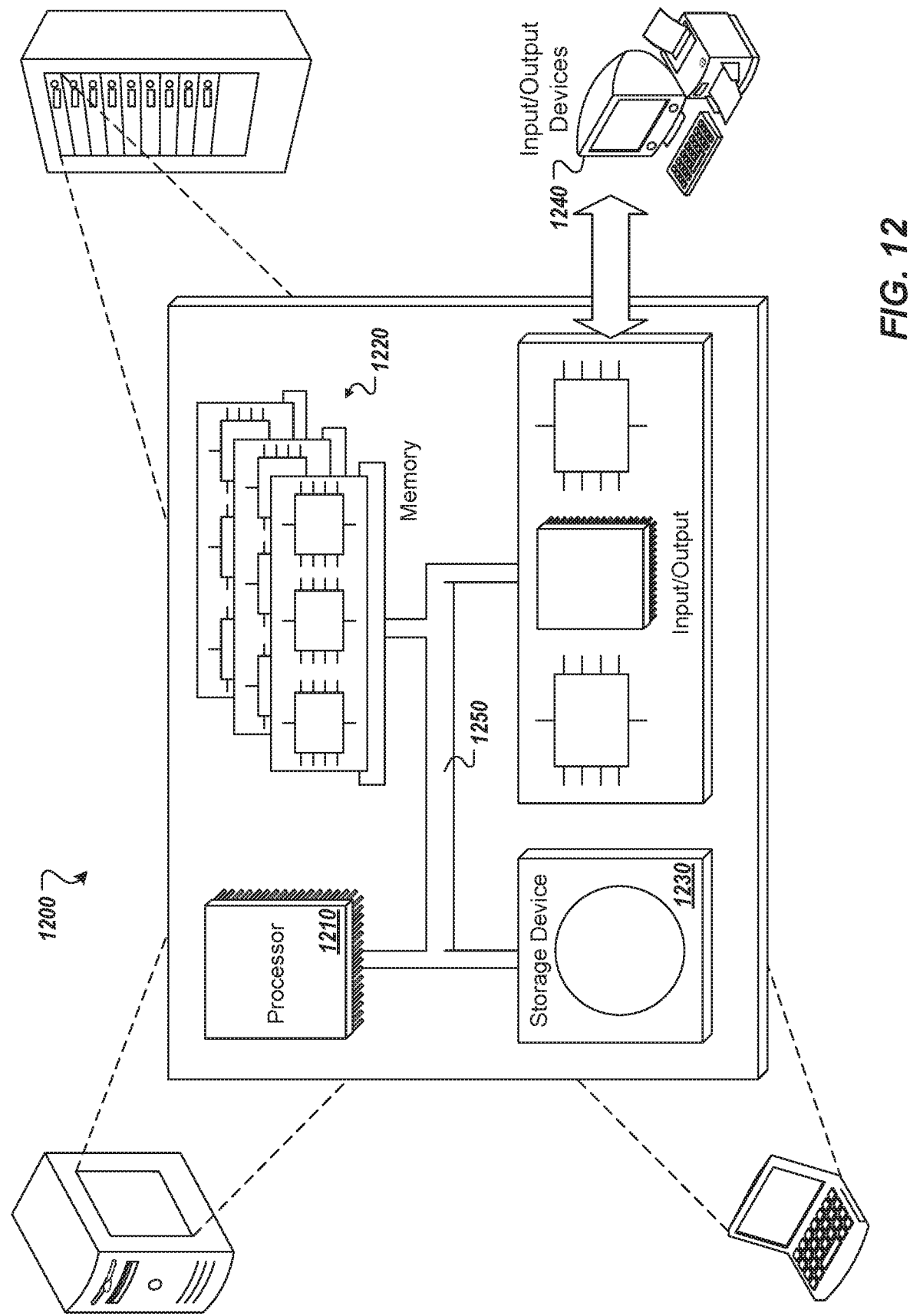
FIG. 12 is a schematic illustration of example computer systems that can be used to execute implementations of the present disclosure.

Referring now to FIG. 12, a schematic diagram of an example computing system 1200 is provided. The system 1200 can be used for the operations described in association with the implementations described herein. For example, the system 1200 may be included in any or all of the server components discussed herein. The system 1200 includes a processor 1210, a memory 1220, a storage device 1230, and an input/output device 1240. The components 1210, 1220, 1230, 1240 are interconnected using a system bus 1250. The processor 1210 is capable of processing instructions for execution within the system 1200. In some implementations, the processor 1210 is a single-threaded processor. In some implementations, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In some implementations, the memory 1220 is a computer-readable medium. In some implementations, the memory 1220 is a volatile memory unit. In some implementations, the memory 1220 is a non-volatile memory unit. The storage device 1230 is capable of providing mass storage for the system 1200. In some implementations, the storage device 1230 is a computer-readable medium. In some implementations, the storage device 1230 may be a floppy disk device, a hard disk device, an optical disk device, or a tape device. The input/output device 1240 provides input/output operations for the system 1200. In some implementations, the input/output device 1240 includes a keyboard and/or pointing device. In some implementations, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for privacy-preserving verification of a product claim for a product provided from a supply chain, the method being executed by one or more processors and comprising:
   receiving, by a system of a re-encryption party, an index and a first set of random numbers from a computing device of a verifier, the first set of random numbers comprising one or more random numbers;
   receiving, by the system of the re-encryption party and from a shared data storage, encrypted supply chain data (SCD) of a supply chain actor (SCA);

re-encrypting, by the system of the re-encryption party, the encrypted SCD to provide re-encrypted SCD, the encrypted SCD being re-encrypted under a public encryption key of a decryption party;

executing, by the system of the re-encryption party, one or more homomorphic operations on the re-encrypted SCD to provide an encrypted blinded result using a second set of random numbers;

receiving, by the system of the re-encryption party and from a system of the decryption party, an encrypted modified blinded result;

generating, by the system of the re-encryption party, an encrypted blinded verification result using a verification function, the encrypted blinded result, the encrypted modified blinded result, and the first set of random numbers; and sending, from the system of the re-encryption party to the system of the decryption party, the encrypted blinded verification result, the system of the decryption party decrypting the encrypted blinded verification result to provide a blinded verification result to the computing device of the verifier, the computing device determining a verification result based on the blinded verification result and the first set of random numbers, and comparing the verification result to the product claim.

2. The method of claim 1, wherein the encrypted SCD is determined from the shared data storage by traversing entries to an entry of the SCA, the entry storing the encrypted SCD.

3. The method of claim 1, wherein the encrypted blinded verification result is at least partially generated by:
providing an encrypted verification result from the verification function; and
executing at least one homomorphic operation on the encrypted verification result using the first set of random numbers to provide the encrypted blinded verification result.

4. The method of claim 1, wherein the system of the decryption party generates the encrypted modified blinded result by:
receiving the encrypted blinded result from the system of the re-encryption party;
decrypting, using a secret decryption key of the decryption party, the encrypted blinded result to provide a blinded result;
executing a mathematical operation on the blinded result to provide a modified blinded result; and
encrypting the modified blinded result using the public encryption key of the decryption party to provide the encrypted modified blinded result.

5. The method of claim 1, wherein the second set of random numbers comprises a first random number and a second random number, the first random number being exponentially larger than the second random number and the second random number being greater than zero.

6. The method of claim 1, wherein the encrypted SCD is encrypted with a public encryption key of the SCA.

7. The method of claim 1, wherein the shared data storage comprises a distributed ledger.

8. A non-transitory computer-readable storage medium coupled to one or more processors and having instructions stored thereon which, when executed by the one or more processors, cause the one or more processors to perform operations for privacy-preserving verification of a product claim for a product provided from a supply chain, the operations comprising:

receiving, by a system of a re-encryption party, an index and a first set of random numbers from a computing device of a verifier, the first set of random numbers comprising one or more random numbers;

receiving, by the system of the re-encryption party and from a shared data storage, encrypted supply chain data (SCD) of a supply chain actor (SCA);

re-encrypting, by the system of the re-encryption party; the encrypted SCD to provide re-encrypted SCD, the encrypted SCD being re-encrypted under a public encryption key of a decryption party;

executing, by the system of the re-encryption party, one or more homomorphic operations on the re-encrypted SCD to provide an encrypted blinded result using a second set of random numbers;

receiving, by the system of the re-encryption party and from a system of the decryption party, an encrypted modified blinded result;

generating, by the system of the re-encryption party, an encrypted blinded verification result using a verification function, the encrypted blinded result, the encrypted modified blinded result, and the first set of random numbers; and sending, from the system of the re-encryption party to the system of the decryption party, the encrypted blinded verification result, the system of the decryption party decrypting the encrypted blinded verification result to provide a blinded verification result to the computing device of the verifier, the computing device determining a verification result based on the blinded verification result and the first set of random numbers, and comparing the verification result to the product claim.

9. The non-transitory computer-readable storage medium of claim 8; wherein the encrypted SCD is determined from the shared data storage by traversing entries to an entry of the SCA, the entry storing the encrypted SCD.

10. The non-transitory computer-readable storage medium of claim 8, wherein the encrypted blinded verification result is at least partially generated by:
providing an encrypted verification result from the verification function; and
executing at least one homomorphic operation on the encrypted verification result using the first set of random numbers to provide the encrypted blinded verification result.

11. The non-transitory computer-readable storage medium of claim 8, wherein the system of the decryption party generates the encrypted modified blinded result by:
receiving the encrypted blinded result from the system of the re-encryption party;
decrypting, using a secret decryption key of the decryption party, the encrypted blinded result to provide a blinded result;
executing a mathematical operation on the blinded result to provide a modified blinded result; and
encrypting the modified blinded result using the public encryption key of the decryption party to provide the encrypted modified blinded result.

12. The non-transitory computer-readable storage medium of claim 8, wherein the second set of random numbers comprises a first random number and a second random number, the first random number being exponentially larger than the second random number and the second random number being greater than zero.

13. The non-transitory computer-readable storage medium of claim 8, wherein the encrypted SCD is encrypted with a public encryption key of the SCA.

14. The non-transitory computer-readable storage medium of claim 8, wherein the shared data storage comprises a distributed ledger.

15. A system, comprising:
   a computing device; and
   a computer-readable storage device coupled to the computing device and having instructions stored thereon which, when executed by the computing device, cause the computing device to perform operations for privacy-preserving verification of a product claim for a product provided from a supply chain, the operations comprising:
   receiving, by a system of a re-encryption party, an index and a first set of random numbers from a computing device of a verifier, the first set of random numbers comprising one or more random numbers;
   receiving, by the system of the re-encryption party and from a shared data storage, encrypted supply chain data (SCD) of a supply chain actor (SCA);
   re-encrypting, by the system of the re-encryption party, the encrypted SCD to provide re-encrypted SCD, the encrypted SCD being re-encrypted under a public encryption key of a decryption party;
   executing, by the system of the re-encryption party, one or more homomorphic operations on the re-encrypted SCD to provide an encrypted blinded result using a second set of random numbers;
   receiving, by the system of the re-encryption party and from a system of the decryption party, an encrypted modified blinded result;
   generating, by the system of the re-encryption party, an encrypted blinded verification result using a verification function, the encrypted blinded result, the encrypted modified blinded result, and the first set of random numbers; and
   sending, from the system of the re-encryption party to the system of the decryption party, the encrypted blinded verification result, the system of the decryption party decrypting the encrypted blinded verification result to provide a blinded verification result to the computing device of the verifier, the computing device determining a verification result based on the blinded verification result and the first set of random numbers, and comparing the verification result to the product claim.

16. The system of claim 15, wherein the encrypted SCD is determined from the shared data storage by traversing entries to an entry of the SCA, the entry storing the encrypted SCD.

17. The system of claim 15, wherein the encrypted blinded verification result is at least partially generated by:
   providing an encrypted verification result from the verification function; and
   executing at least one homomorphic operation on the encrypted verification result using the first set of random numbers to provide the encrypted blinded verification result.

18. The system of claim 15, wherein the system of the decryption party generates the encrypted modified blinded result by:
   receiving the encrypted blinded result from the system of the re-encryption party;
   decrypting, using a secret decryption key of the decryption party, the encrypted blinded result to provide a blinded result;
   executing a mathematical operation on the blinded result to provide a modified blinded result; and
   encrypting the modified blinded result using the public encryption key of the decryption party to provide the encrypted modified blinded result.

19. The system of claim 15, wherein the second set of random numbers comprises a first random number and a second random number, the first random number being exponentially larger than the second random number and the second random number being greater than zero.

20. The system of claim 15, wherein the encrypted SCD is encrypted with a public encryption key of the SCA.

* * * * *